United States Patent
Kamon et al.

(10) Patent No.: US 6,429,941 B1
(45) Date of Patent: Aug. 6, 2002

(54) DISTANCE MEASURING EQUIPMENT AND METHOD

(75) Inventors: Koichi Kamon, Takatsuki; Toshio Norita, Osaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/352,346

(22) Filed: Jul. 13, 1999

(30) Foreign Application Priority Data

Jul. 14, 1998 (JP) .......................................... 10-198241
Jul. 14, 1998 (JP) .......................................... 10-198242

(51) Int. Cl.[7] ............................ G01B 11/24; G01C 3/08
(52) U.S. Cl. ....................... 356/614; 356/5.01; 356/5.03
(58) Field of Search ................................. 356/601, 602, 356/614, 622, 623, 5.01, 5.02–5.08, 5.12; 250/559.22, 559.23, 559.31

(56) References Cited

U.S. PATENT DOCUMENTS 5,179,286 A  * 1/1993  Akasu .............................. 356/5
5,633,706 A  * 5/1997  Cho et al. .................... 356/5.01
5,852,491 A  * 12/1998  Kato ........................... 356/5.01
6,141,105 A  * 10/2000  Yahashi et al. .............. 356/376
6,229,598 B1 * 5/2001  Yoshida ....................... 356/5.01

FOREIGN PATENT DOCUMENTS

JP        05259036        10/1993
JP        06002264        1/1994

* cited by examiner

Primary Examiner—Hoa Q. Pham
(74) Attorney, Agent, or Firm—McDermott, Will & Emery

(57) ABSTRACT

A distance measuring equipment and method that measures a distance to an object with high accuracy regardless of the reflectivity of the object is disclosed. The distance measuring equipment includes a transmitter for transmitting pulsed light to the outside, a receiver for receiving the pulsed light reflected by an object in the outside and performing photoelectric conversion and a measuring portion for measuring a time period from the transmission time point of the pulsed light to the reception time point of the reflected light so as to output data of the distance to the object. The measuring portion periodically samples the electric signal obtained by the photoelectric conversion of the receiver and memorize plural instantaneous values at plural time points. Then, the measuring portion determines the time point at the inflection point of the quantity variation of the received light on the basis of the memorized plural instantaneous values so as to generate the data of the distance to the object on the basis of the determined time point as the reception point.

8 Claims, 24 Drawing Sheets

30D RECEPTION PROCESS CIRCUIT

30E RECEPTION PROCESS CIRCUIT

DISTANCE MEASURING EQUIPMENT AND METHOD

BACKGROUND OF THE INVENTION

This application is based on Japanese Patent Application No. 198241/1998 filed on Jul. 14, 1998 and No. 198242/1998 filed on Jul. 14, 1998, the contents of which are incorporated herein by reference.

1. Field of the Invention

The present invention relates to a distance measuring equipment and method for measuring a distance to an object on the basis of a round-trip propagation time for light to travel between the equipment and an object that reflects the light.

2. Description of the Prior Art

A distance to an object can be obtained by measuring a time period from a transmission point of pulsed light to a reception point of the pulsed light reflected by the object, and using the known propagation speed of light. This method for measuring a distance is used in a lot of fields including civil engineering and astronomy. Though an accuracy of the measurement becomes higher if the pulse width becomes closer to zero in principle, the pulse width is restricted in a range above a certain value depending on a responsiveness of the light source and reception sensitivity. In a general distance measuring equipment and method, the pulse width has a value between 50 and 100 microns that can provide a resolution of approximately a several centimeters. The waveform of the pulse has a single crest.

Conventionally, the time point when the quantity of received light increases and reaches a predetermined threshold is regarded as the time point when the light is received (reception time point). Though the simplest method for detecting the reception time point is to compare the quantity of the received light with a single threshold, the measurement error due to variation of the reflectivity of the object may become conspicuous. It is because that the time when the quantity of the reflected light reaches the threshold may be delayed if the reflectivity is low and the amplitude of the quantity of the received light is small compared with the case where the amplitude is large. Therefore, it is proposed to set a plurality of threshold levels and to detect the time point when the quantity of the reflected light reaches the highest threshold level (Japanese Unexamined Patent Publication Hei 5-100026). By this method, the time point within a range that is close to the peak of the waveform of the received signal is determined as the reception time point, so that the measurement error can be reduced.

However, in the conventional method, the threshold level is not always identical to the maximum quantity of received light. Therefore, the shift of the reception time point due to the variation of the amplitude in the received light is not canceled completely. A small interval between the threshold levels is required in order to reduce the measurement error. Thus, a light reception circuit having a lot of comparators is needed. In addition, if the peak portion of the received waveform is not steep or has double peaks, it is difficult to ensure a desired accuracy of the measurement.

SUMMARY OF THE INVENTION

The object of the present invention is to provide a distance measuring equipment and method that can perform the measurement with high accuracy regardless of the reflectivity of the object.

According to one preferable embodiment of the present invention, a distance measuring equipment includes a transmitter for transmitting pulsed light to the outside, a receiver for receiving the pulsed lighted reflected by an object in the outside and performing photoelectric conversion, and a measuring portion for measuring a time period from the transmission time point of the pulsed light to the reception time point of the reflected light so as to output data of the distance to the object. The measuring portion periodically samples the electric signal obtained by the photoelectric conversion of the receiver to memorize plural instantaneous values at plural time points and determines the time point at the peak of the quantity variation of the received light on the basis of the memorized plural instantaneous values so as to generate the data of the distance to the object on the basis of the determined time point as the reception point.

The language "distance to the object" generally means a numeric information having a value corresponding to the distance to the object, and includes data indicating a round-trip propagation time for the pulsed light to travel between the equipment and the object, as well as a one-way propagation time determined from the round-trip propagation time. The language "output" means to provide information that includes signal transmission to another equipment, display on a graphic or numeric display device and information by a sound signal.

Preferably, the electric signal is an integral analog signal of the photoelectric conversion signal from the received pulsed light.

According to another embodiment of the present invention, the transmitter transmits the pulsed light to the object and the receiver simultaneously. The receiver receives the pulsed light from the transmitter and the object so as to perform the photoelectric conversion. The measuring portion generates the data of the distance to the object on the basis of the determined first point as the transmission time point and the determined second point as the reception time point.

According to the other embodiment of the present invention, the measuring portion detects rising and falling edges of a quantity variation of the received light of the pulsed light on the basis of the electric signal, determines the time point at the peak of the quantity variation of the received light, and generates the data of the distance to the object by regarding the determined time point as the reception time point.

The language of "rising edge" means the time point when the quantity of the received light becomes a predetermined value for the first time, and the language of "falling edge" means the time point when the quantity of the received light becomes a predetermined value for the last time. If the predetermined value is sufficiently small, the rising edge can be substantially regarded as the start time point of the reception of the light, while the falling edge can be substantially regarded as the end time point of the reception of the light.

DESCRIPTION OF THE PREFERRED EMBODIMENTS

First Embodiment

Figure 1:
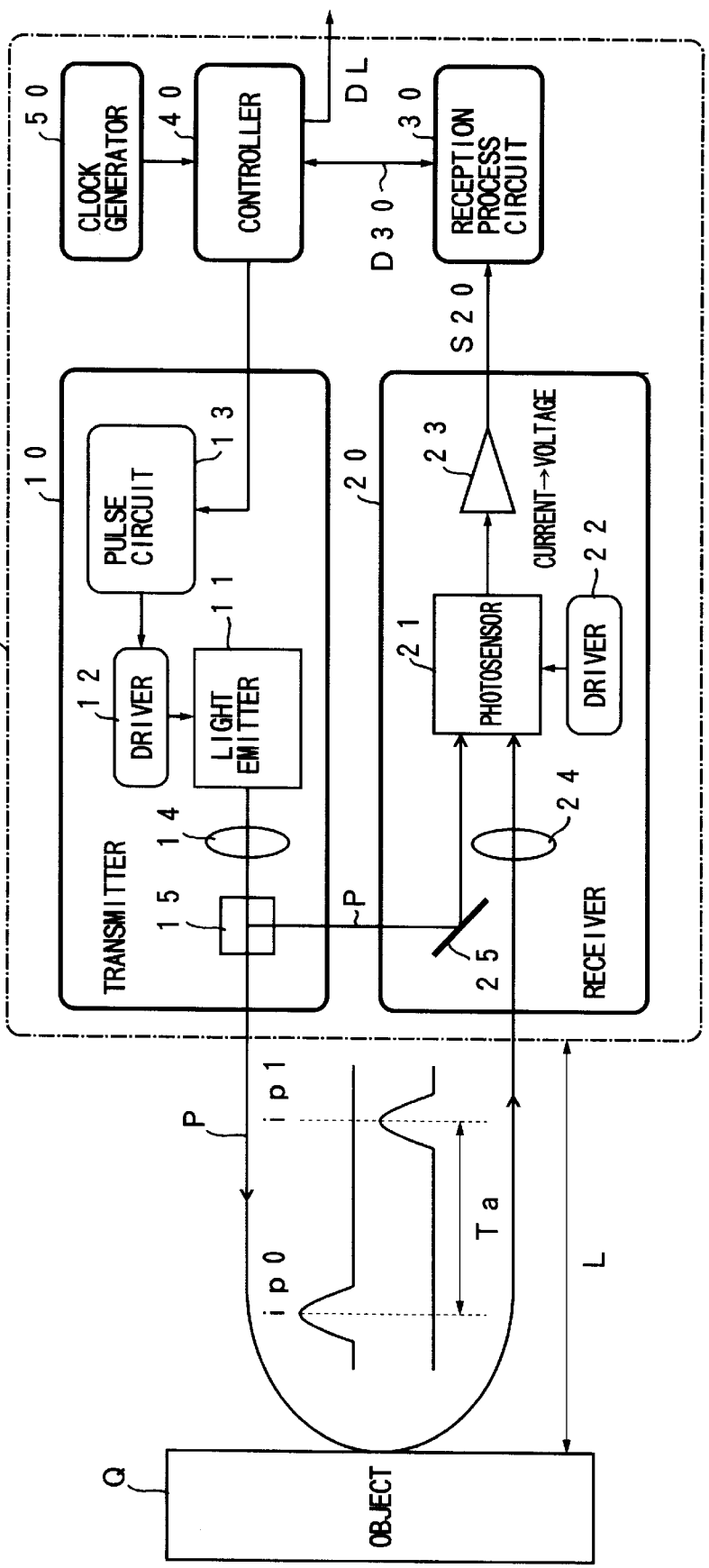
FIG. 1 is a diagram schematically showing a distance measuring equipment according to a first embodiment of the present invention.

FIG. 1 is a diagram schematically showing a distance measuring equipment according to a first embodiment of the present invention.

The distance measuring equipment 1 includes a transmitter 10, a receiver 20, a reception process circuit 30, a controller 40 and a clock generator 50. The transmitter 10 includes a light emitter (i.e., a semiconductor laser) 11, a driver 12 for the light emitter, a pulse circuit 13 for restricting the emission period, a lens 14 for transmitting light and a light divider 15. The transmitter 10 transmits pulsed light P having a pulse width of approximately 100 nanoseconds to the outside and the receiver 20 responding to the instruction of the controller 40. The quantity of light transmitted to the receiver 20 can be small. The light divider 15 divides the pulsed light by the ratio of 100–1000:1 for the outside and the receiver 20. The receiver 20 includes a photosensor (e.g., a photodiode) 21, a driver 22 for the photosensor 21, an amplifier 23 for converting a photocurrent into a voltage, a lens 24 for receiving light and a mirror 25 for leading the pulsed light from the transmitter 10 to the photosensor 21.

The receiver 20 outputs the received signal (the photo-electrically converted signal) S20 to the reception process circuit 30. The reception process circuit 30 generates the data D30 corresponding to the distance L to the object Q in the outside in accordance with the received signal 20. The data D30 represents a time barycenter ip0 of the light quantity variation of the pulsed light P that enters the receiver 20 directly from the transmitter 10 and a time barycenter ip1 of the light quantity variation of the pulsed light P that enters the receiver 20 after reflected by the object Q. The time barycenters ip0 and ip1 represent peak points where the quantity of the received light is the maximum.

The detail of that will be explained later. A controller 40 performs the calculation of the time period between the time barycenters ip0 and ip1 as the light propagation time Ta (i.e., the time for the light to travel the distance L) and the calculation of distance L by applying the known light propagation speed (i.e., $3 \times 10^8$ meters per second). The calculated distance L is outputted as the measurement data DL to another equipment (such as a display or a computer). The reception process circuit 30 is provided with a clock for regulating the sampling period via the controller 40 from the clock generator 50.

According to the distance measuring equipment 1, as mentioned above, a distance to an object q can be measured with a high accuracy regardless of a reflectivity of the object Q by determining the transmission time point in the measurement of the light propagation time Ta as the time barycenter ip0 and the reception time point as the time barycenter ip1. This is because that the peak of the pulse waveform, I.e., the peak position on the time axis does not vary though the quantity of the received light may vary in accordance with the reflectivity of the object. In addition, though the transmission time point can be set on the basis of the output timing of the light emission control signal, it is better to monitor the actual quantity of the transmitted light to detect the time barycenter ip0 as the present embodiment, so that influences of character variation of the light emitter, delay of the control signal and other factors.

Figure 2:
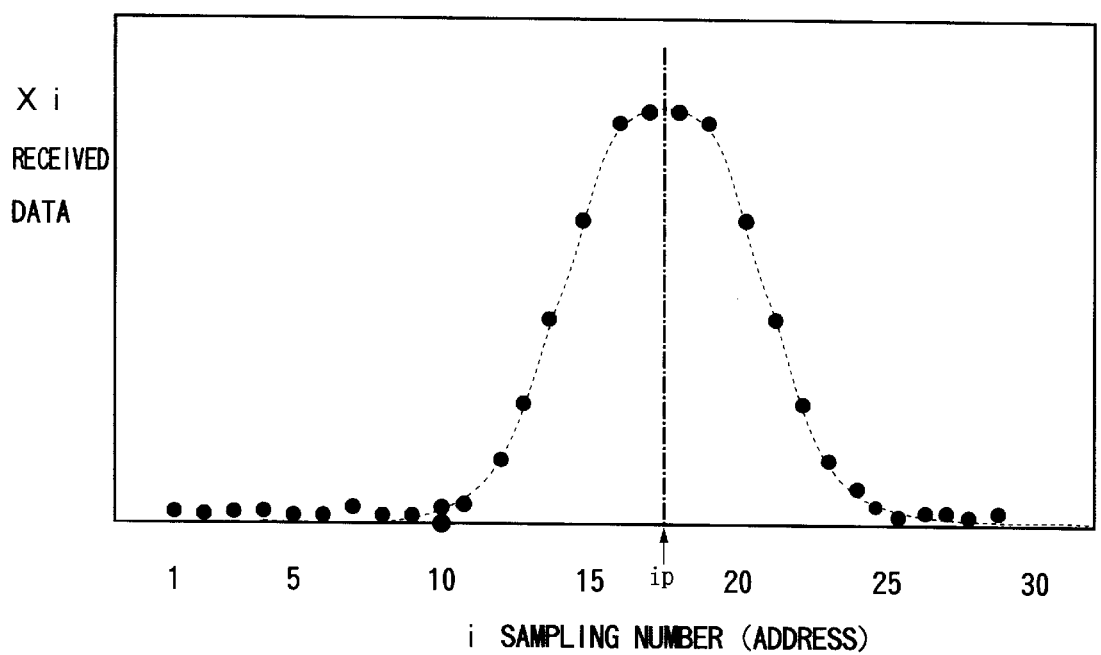
FIG. 2 is a diagram showing the concept of a time barycenter.

FIG. 2 shows the concept of a time barycenter.

A time barycenter ip is a barycenter on the time axis in distribution of the received light data of a predetermined number n (e.g., n=30 in FIG. 2) that are obtained by periodically sampling the received light quantity of the pulsed light. The barycenter ip represents the peak point where the quantity of the received light is the maximum. The received light data at each of the sampling points is affixed by a sampling number i. Namely, Xi represents the i-th data of the received light. The number i is an integer within 1–n, which represents an address of a memory for memorizing the received light data.

The time barycenter ip of the received light data X1–Xn is calculated by dividing the sum $\Sigma \, i \cdot Xi$ of $i \cdot Xi$ by sum $\Sigma \, Xi$ of Xi with respect to n of received light data as shown in the following equation.

$$ip = \frac{\sum_{i=1}^{n} i \cdot Xi}{\sum_{i=1}^{n} Xi} \tag{1}$$

The reception process circuit 30 performs the operation in accordance with the equation (1).

Figure 3:
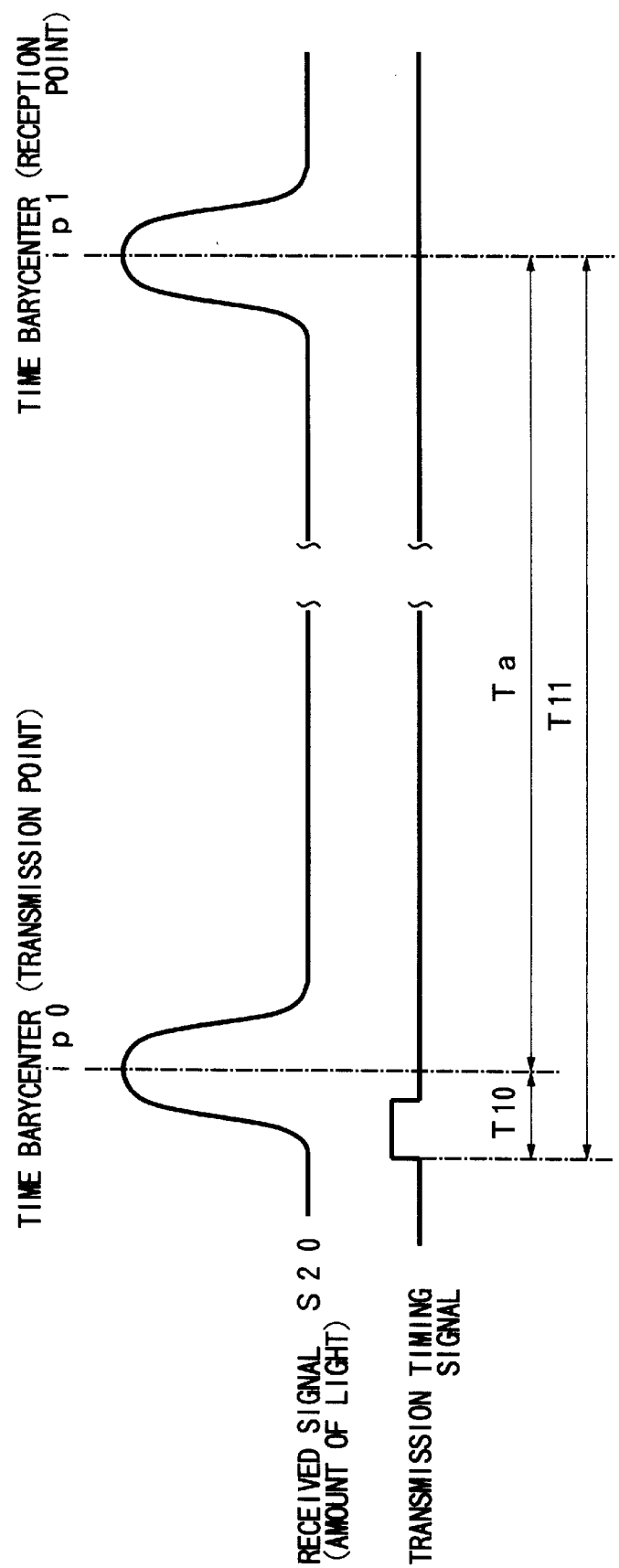
FIG. 3 is a diagram showing the principle of the calculation of the light propagation time.
Figure 4:
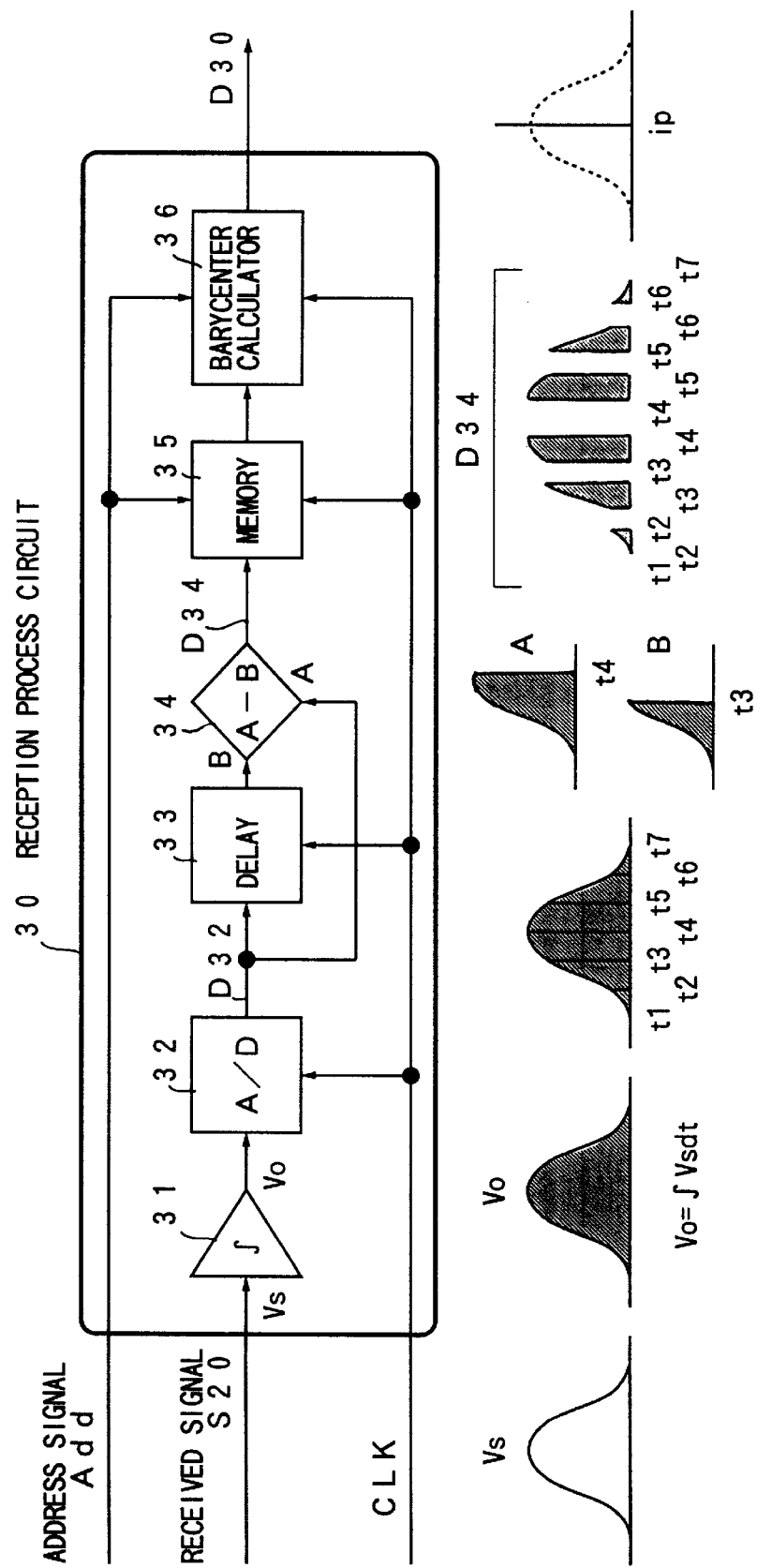
FIG. 4 is a diagram showing a block diagram of the reception process circuit.

FIG. 3 shows the principle of the calculation of the light propagation time, and FIG. 4 shows a block diagram of the reception process circuit 30.

As mentioned above, the photosensor 21 receives the pulsed light P from the transmitter 10 and the outside in turn. Therefore, two peaks appear in the received signal S20 as shown in FIG. 3. The light propagation time Ta (=T11−T10) can be calculated by measuring the time T10 from an appropriate time point adjacent to the point of transmission start of the pulsed light P to the time barycenter ip0 of the transmission (i.e., the first) peak and the time T11 from the appropriate time point to the time barycenter ip1 of the reception (i.e., the second) peak.

The reception process circuit 30 includes an integral circuit 31, an analog-to-digital (A/D) converter 32, a delay circuit 33, a subtracter 34, a memory 35 and a barycenter calculator 36. The received signal S20 is inputted to the integral circuit 31 from the receiver 20. When the value of the received signal S20 is Vs, the value Vo of the output signal S31 of the integral circuit 31 is expressed by the following equation.

$$Vo = \int_0^t Vs\,dt \qquad (2)$$

The A/D converter 32 samples and holds the output signal S31 of the integral circuit 31 in synchronization with the clock CLK to digitize the output signal S31 periodically.

The period of the clock CLK is much shorter than the pulse width of the pulsed light P; it is approximately 10 nanoseconds, for example. In FIG. 4, the output signal S31 is sampled at time points t1–t7. The sampling data D32 outputted by the A/D converter 32 corresponds to the accumulation of the received light from the integration start to the sampling time point. For example, the value of the sampling data D32(t4) at the time point t4 is obtained by digitizing the Vo(t4), which is expressed by the following equation.

$$Vo(t4) = \int_0^{t4} Vs\,dt \qquad (3)$$

The subtracter 34 is provided with the latest sampling data D32(ti) in synchronization with the clock CLK and the sampling data D32(ti−1) that is delayed by one clock period via the delay circuit 33. The subtracter performs differential operation to generate the received light data D34 that corresponds to the integral result of the received signal S20 for one clock period. The received light data D34 is expressed by the following equation.

D34=D32(ti)−D32(ti−1)

For example, the received light data D34(t4) at the time point t4 corresponds to the integral value Vo' (t4) from the time point t3 to the time point t4.

$$Vo'(t4) = \int_{t3}^{t4} Vs\,dt \qquad (4)$$

The memory 35 memorizes the received light data D34 in synchronization with the clock CLK. On this occasion, addressing is performed by an address signal Add from the controller 40. The address is incremented by the clock period. In other words, one address is assigned to each of the sampling time points of the received signal S20, and the sequential received light data D34 corresponding to the sampling time points are memorized sequentially. The memory 35 has an adequate data capacity necessary for memorizing the data for the light propagation time of the maximum distance that can be measured.

When a predetermined time corresponding to the maximum measurable distance passes after starting the measurement, reading of the received light data D34 from the memory 35 is started. The address range for reading is set for determination of the transmission time point independently of that for determination of the reception time point; n addresses are assigned to each. The received light data D34 that is read is sent to the barycenter calculator 36. The barycenter calculator 36 outputs data D30 that represents the time barycenters ip0 and ip1 corresponding to peak points of transmission and reception, to the controller 40.

Figure 5:
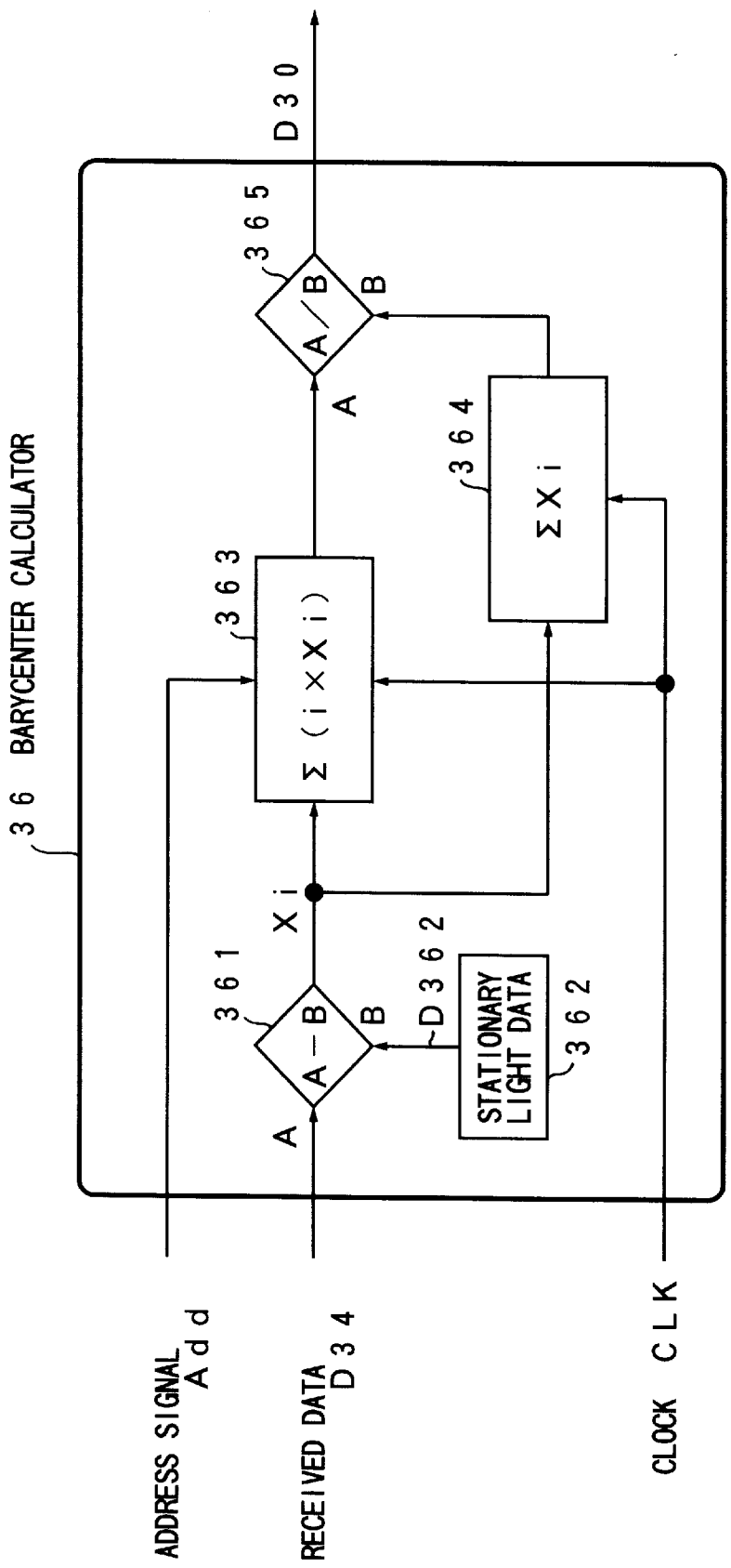
FIG. 5 is a block diagram of the barycenter calculator.

FIG. 5 is a block diagram of the barycenter calculator 36.

In this embodiment, the barycenter calculator 36 performs the barycenter calculation not on the basis of the received light data D34 itself from the memory 35 but on the basis of the value after subtracting the stationary light data from each of the received light data D34 (on the basis of zero if the value is less than zero). The stationary light data is previously determined in accordance with the received light data when the pulsed light is not inputted. Thus, the quantity of the received light is offset.

The barycenter calculator 36 includes a subtracter 361, a stationary light data memory 362, a first adder 363, a second adder 364 and a divider 365. These are made up by a hardware circuit, though all or a part of them can be made up by a software.

The stationary light data memory 362 memorizes the stationary light data D362. The subtracter 361 subtracts the stationary light data D362 from the received light data D34.

Here, the data outputted by the subtracter 361 is considered as the received light data Xi. The first adder 363 adds the i·Xi for i=1 through n, and outputs the sum. The second adder 364 adds the Xi for i=1 through n and outputs the sum. The divider 365 divides the output value of the first adder 363 by the output value of the second adder 364 so as to calculate the time barycenters ip0 and ip1.

According to the above-mentioned reception process circuit 30, which has the integral circuit 31, the received light data Xi to be used for the calculation of the barycenter is an interpolated data on the basis of the quantity variation of the received light during one clock period. Therefore, more information about the waveform of the pulsed light and higher precision of the barycenter calculation can be obtained than in the case where the received signal S20 is sampled without any process.

Figure 6:
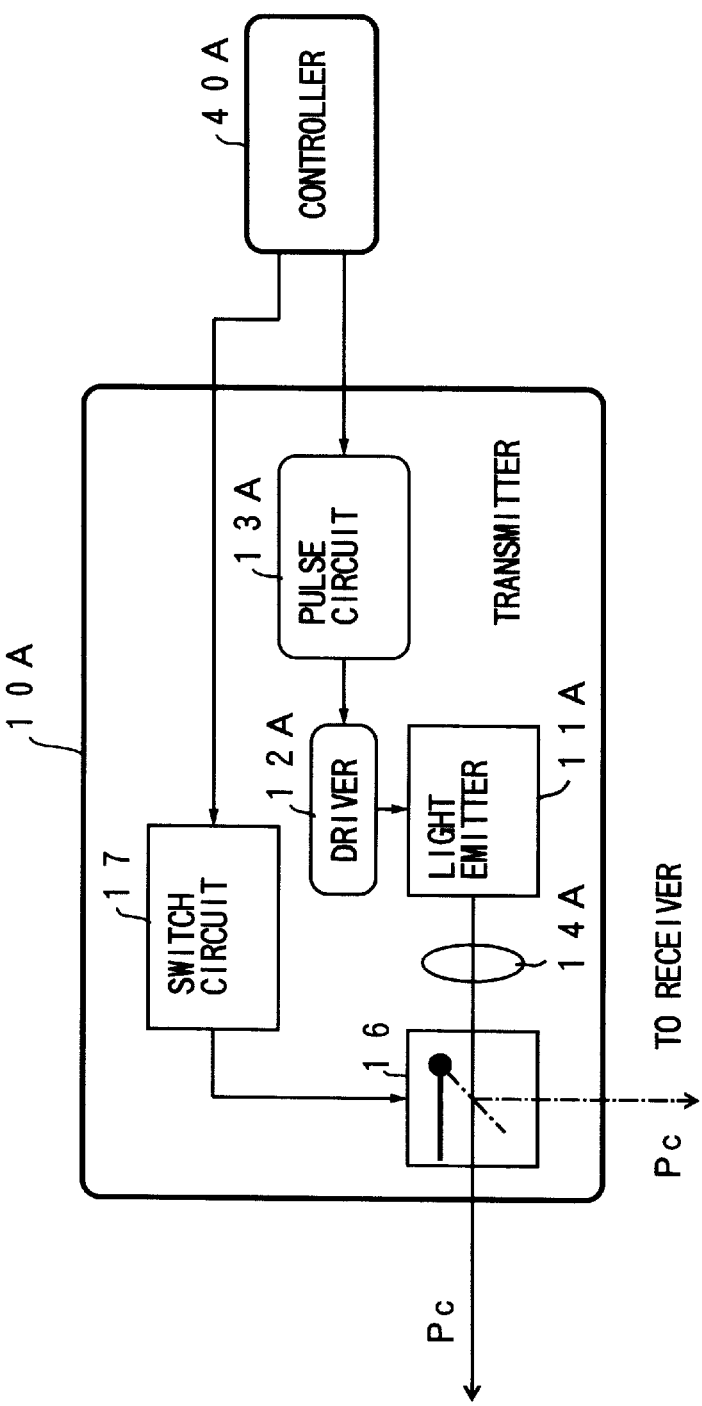
FIG. 6 is a block diagram of a variation of the transmitter.

FIG. 6 is a block diagram of a variation of the transmitter. In FIG. 6, each element of the transmitter 10A has the same reference numeral as the element having the same function of the transmitter 10 shown in FIG. 1 and suffix "A".

The transmitter 10A includes a light emitter (i.e., a semiconductor laser) 11A, a driver 12A for the light emitter, a pulse circuit 13A for restricting the emission period, a lens 14A for transmitting light, a switcher 16 of the optical path, and a switch circuit 17. The pulse circuit 13A and the switch circuit 17 are controlled by the controller 50A.

The transmitter 10A selectively transmits the pulsed light Pc either to the receiver or to the outside. Thus, the pulsed light Pc enters the receiver. Accordingly, a pulse waveform without influence of the outside light can be observed since the pulsed light is transmitted only to the receiver during maintenance or adjustment, for example. According to this variation, the time period from the transmission timing signal to the peak of the quantity of the transmitted light can be measured. This time period is memorized so that the actual light transmission timing can be determined on the basis of the light transmission timing signal and the time period. Therefore, entire quantity of the light can be transmitted to the outside without leading the part of the transmitted light to the receiver when measuring a distance.

Figure 7:
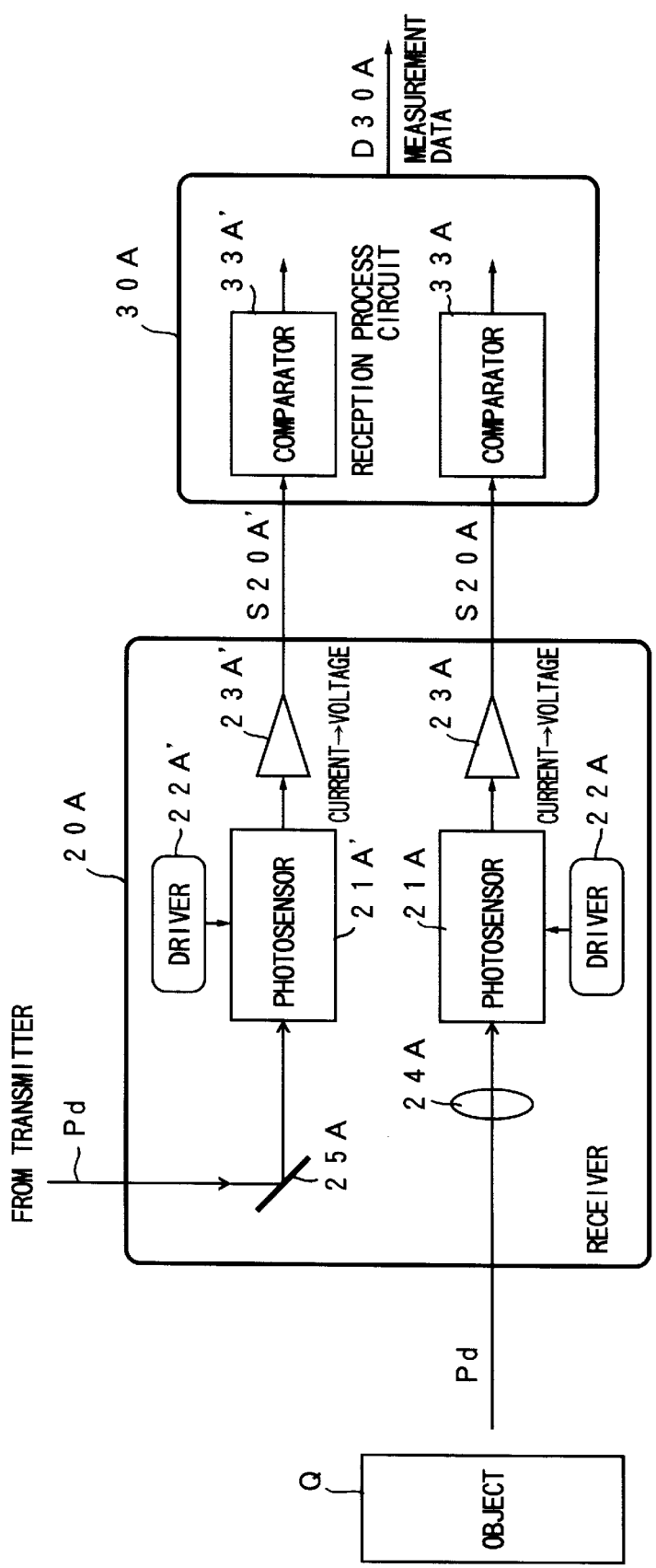
FIG. 7 is a block diagram showing a variation of the receiver.

FIG. 7 is a block diagram showing a variation of the receiver. In FIG. 7, each element of the receiver 20A has the same reference numeral as the element having the same function of the receiver 20 shown in FIG. 1 and suffix "A".

The receiver 20A includes photosensors 21A and 21A', drivers 22A and 22A' for the photosensors, amplifiers 23A and 23A' each of which converts a photocurrent into a voltage, a lens 24A for receiving light and a mirror 25A for leading the pulsed light Pd from the transmitter to the photosensor 21A'. The photoelectric conversion of the pulsed light Pd that enters from the outside is performed independently of the photoelectric conversion of the pulsed light Pd that enters directly from the transmitter. Received signals S20A and S20A' outputted from the amplifiers 23A and 23A' are converted to binary data independently of each other by comparators 33A and 33A' in the reception process circuit 30A.

According to the above-mentioned doubled system, even if the distance to be measured is relatively short so that the pulse waveforms of transmission and reception overlap each other, the time barycenters ip0 and ip1 can be determined correctly. However, this constitution can generate a measurement error due to a small difference of characteristics between two systems differing from the constitution of one system having only one photosensor for receiving the pulsed light of the transmission and the reception.

Second Embodiment

The above-mentioned embodiment determines both the transmission time point and reception time point on the basis of the photoelectric conversion signal of the pulsed light. However, concerning the transmission it does not always required to perform the photoelectric conversion. The timing of the light emission control can determine the peak point where the quantity of the light is the maximum, and the peak point can be regarded as the transmission time point. This configuration is suitable for simplifying the entire equipment. If the light emission timing is stable, an adequate accuracy of the measurement can be obtained.

Figure 8:
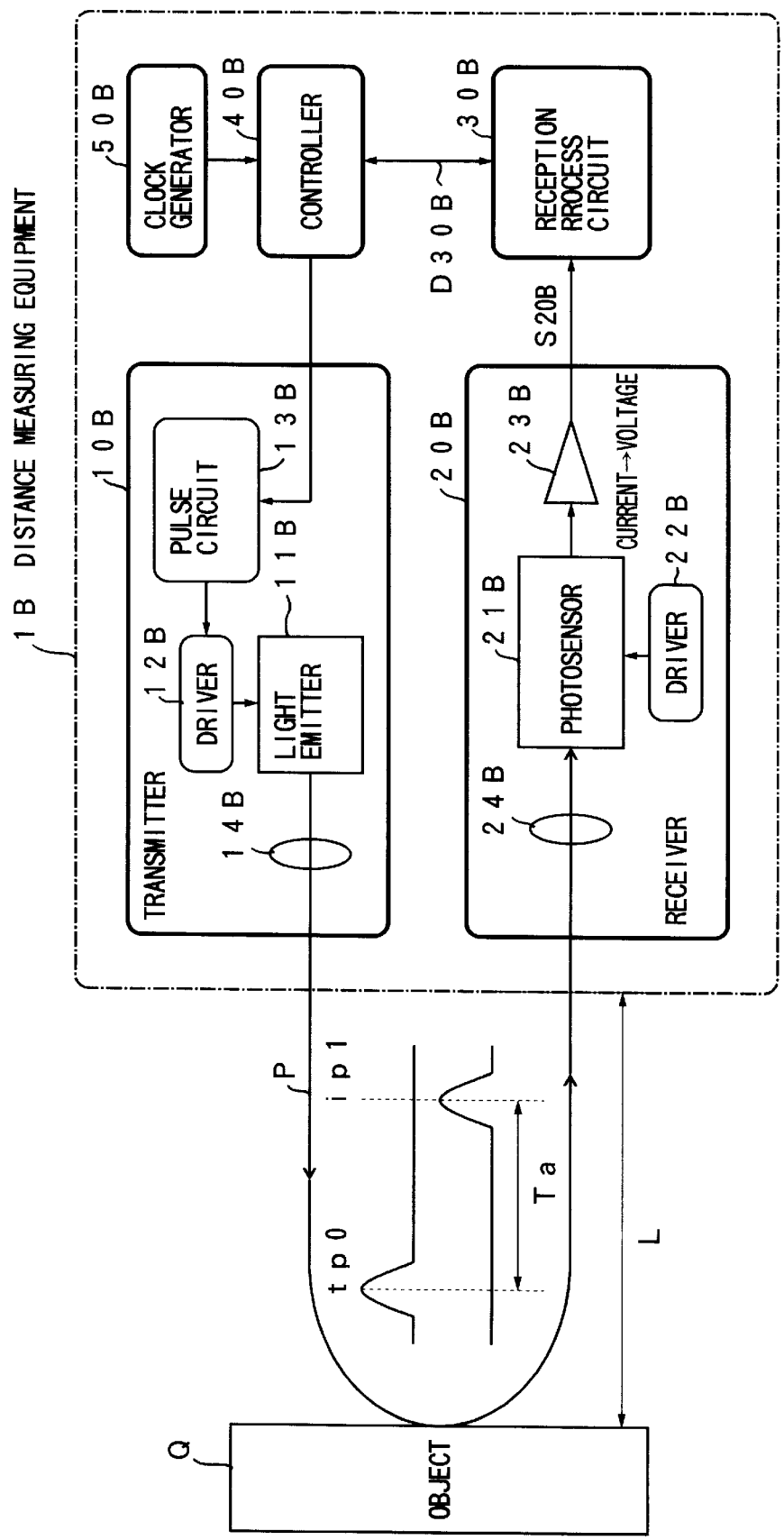
FIG. 8 is a diagram schematically showing a distance measuring equipment according to a second embodiment of the present invention.

FIG. 8 is a diagram schematically showing a distance measuring equipment according to a second embodiment of the present invention. In FIG. 8, each element of the distance measuring equipment 1B has the same reference numeral as the element having the same function of the distance measuring equipment 1 shown in FIG. 1 and suffix "B".

The distance measuring equipment 1B includes a transmitter 10B, a receiver 20B, a reception process circuit 30B, a controller 40B and a clock generator 50B. The transmitter 10B includes a light emitter (e.g., a semiconductor laser) 11B, a driver 12B for the light emitter, a pulse circuit 13B for restricting the emission period and a lens 14B for transmitting light. The transmitter 10B transmits pulsed light P having a pulse width of approximately 100 nanoseconds to the outside responding to the instruction of the controller 40B. The pulse waveform has a symmetric crest. The receiver 20B includes a photosensor (e.g., a photodiode) 21B, a driver 22B for the photosensor 21B, an amplifier 23B for converting a photocurrent into a voltage and a lens 24B for receiving light. The receiver 20B outputs the received signal (the photoelectrically converted signal) S20B to the reception process circuit 30B. The reception process circuit 30B generates the data D30B corresponding to the distance L to the object Q in the outside in accordance with the received signal 20B. The data D30B represents a time barycenter ip1 of the light quantity of the pulsed light P that enters the receiver 20B after reflected by the object Q in the outside. A controller 40B performs the calculation of the light propagation time Ta between the transmission time point tp0 based on the light emission control timing and the time barycenter ip1 and the calculation of distance L from the light propagation time Ta and the known light propagation speed (i.e., $3 \times 10^8$ meters per second). The reception process circuit 30B is provided with a clock for counting time via the controller 40B from the clock generator 50B.

Figure 9:
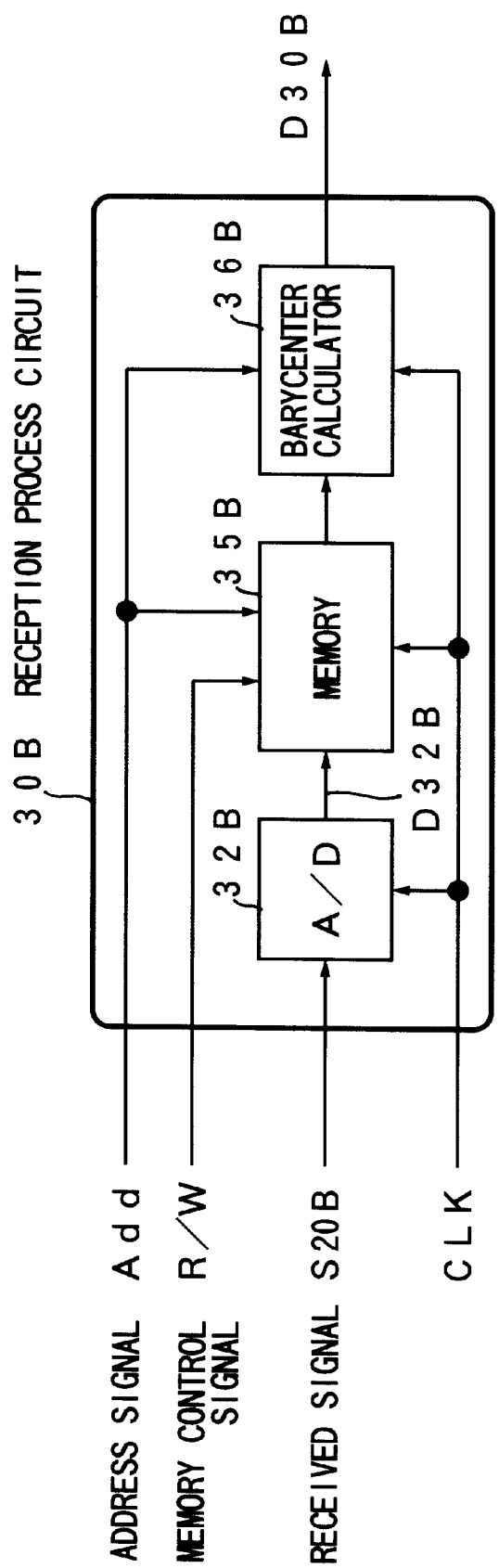
FIG. 9 is a block diagram of the reception process circuit according to the second embodiment of the present invention.
Figure 10:
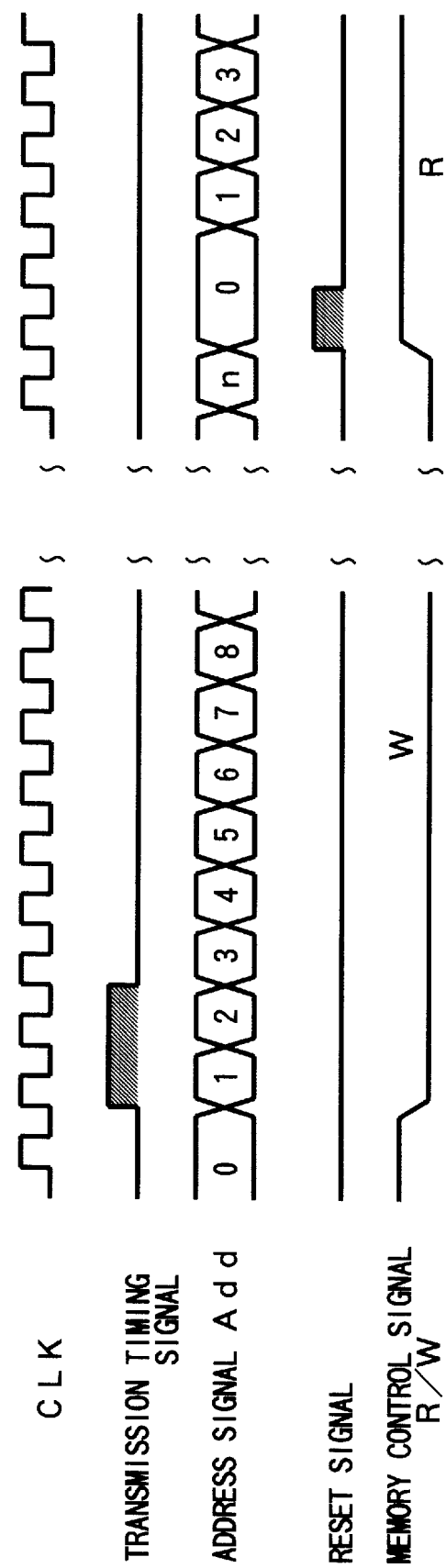
FIG. 10 is a time chart of signals in the reception process.

FIG. 9 is a block diagram of the reception process circuit according to the second embodiment of the present invention, and FIG. 10 is a time chart of signals in the reception process. In FIG. 9, each element of the reception process circuit 30B has the same reference numeral as the element having the same function of the reception process circuit 30 shown in FIG. 4 and suffix "B".

The reception process circuit 30B includes an analog-to-digital (A/D) converter 32B, a memory 35B and a barycenter calculator 36B. The reception process circuit 30B is provided with a clock CLK, an address signal Add and a memory control signal R/W by the controller 40B. The clock period is much shorter than the pulse width of the pulsed light P. The address signal Add is an output of the address counter that counts the clock CLK. The address signal Add is inputted in synchronization with the clock CLK. Therefore, the address assigned to the memory 35B is incremented in synchronization with the clock CLK. The address counter is reset in synchronization with turning on of the transmission timing signal generated in the controller 40B and with switching of the memory control signal R/W from the writing mode level to the reading mode level.

When starting measurement, the memory 35B is set to the writing mode by the memory control signal R/W in synchronization with the transmission timing signal. Then, the received signal S20B is inputted from the receiver 20B. The A/D converter 32B samples and holds the received signal S20B periodically in synchronization with the clock CLK so as to digitize the received signal S20B. The received light signal D32B obtained by the A/D converter 32B is inputted in the memory 35B in synchronization with the clock CLK and is written in each address assigned sequentially. In other words, one address is assigned to each sampling point of the received signal S20B, and the sequential received light data D32B corresponding to the sampling points are memorized sequentially. The memory 35B has an adequate capacity for memorizing the data for the light propagation time corresponding to the maximum distance that can be measured.

When a predetermined time corresponding to the maximum measurable distance passes after starting the measurement, the memory control signal R/W switches from the writing mode level to the reading mode level, and the received light data D32B is read out of the memory 35B from the first address sequentially. The received light data D32B that was read out is sent to the barycenter calculator 36B. The barycenter calculator 36B calculates the time barycenter ip1 corresponding to the peak point of the reception and outputs the data D30B representing the time barycenter ip1 to the controller 40B. The constitution of the barycenter calculator 36B is the same as that explained above with respect to FIG. 5.

According to the distance measuring equipment 1 of the first embodiment, the transmission time point is determined by monitoring the pulsed light. Therefore, measurement with a high accuracy can be realized without influences of signal delay in the circuit and other factors. In addition, the distance measuring equipment 1 and 1B can be used as a three-dimensional input apparatus by changing the transmission orientation of the pulsed light so as to scan the object Q and by measuring the distance to the object for each transmission orientation.

In the above-mentioned embodiments, the determination of the peak points of the transmission and reception by the barycenter calculation can be replaced with detecting the maximum value of the received light data Xi or D32B memorized in the memory 35 or 35B and regarding the address memorizing the maximum value as the peak point. Alternatively, the peak point can be determined by interpolation of data of the addresses neighboring to the address memorizing the maximum value.

Third Embodiment

Figure 11:
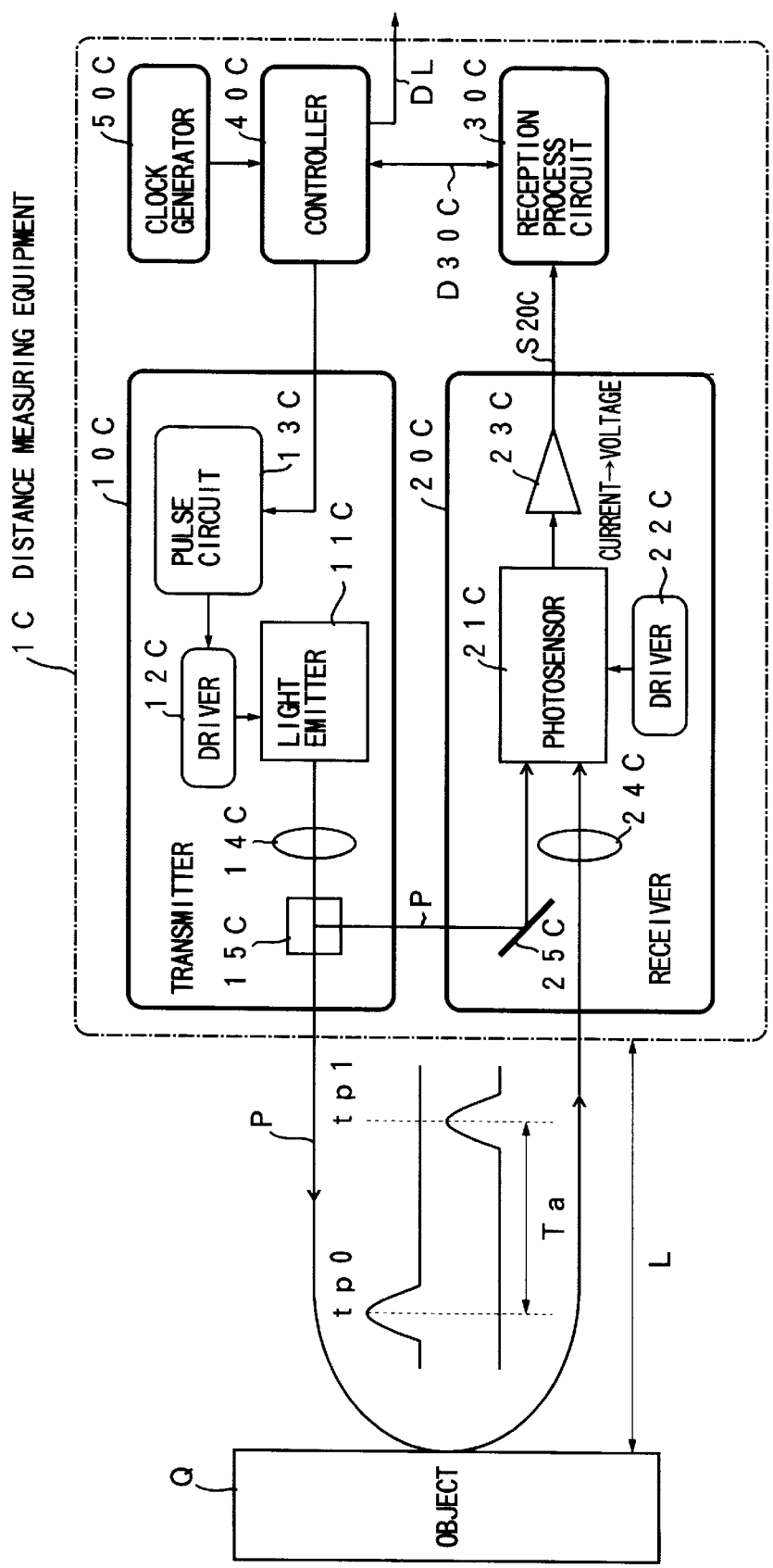
FIG. 11 is a diagram schematically showing a distance measuring equipment according to a third embodiment of the present invention.

FIG. 11 is a diagram schematically showing a distance measuring equipment according to a third embodiment of the present invention. In FIG. 11, each element of the distance measuring equipment 1C has the same reference numeral as the element having the same function of the distance measuring equipment 1 shown in FIG. 1 and suffix "C".

The distance measuring equipment 1C includes a transmitter 10C, a receiver 20C, a reception process circuit 30C, a controller 40C and a clock generator 50C. The transmitter 10C includes a light emitter (e.g., a semiconductor laser) 11C, a driver 12C for the light emitter, a pulse circuit 13C for restricting the emission period, a lens 14C for transmitting light and a light divider 15C. The transmitter 10C transmits pulsed light P having a pulse width of approximately 100 nanoseconds to the outside and the receiver 20C responding to the instruction of the controller 40C. The quantity of light transmitted to the receiver 20C can be small. The light divider 15C divides the pulsed light by the ratio of 100–1000:1 for the outside and the receiver 20C. The receiver 20C includes a photosensor (e.g., a photodiode) 21C, a driver 22C for the photosensor 21C, an amplifier 23C for converting a photocurrent into a voltage, a lens 24C for receiving light and a mirror 25C for leading the pulsed light from the transmitter 10C to the photosensor 21C. The receiver 20C outputs the received signal (the photoelectrically converted signal) S20C to the reception process circuit 30C. The reception process circuit 30C generates the data D30C corresponding to the distance L to the object Q in the outside on the basis of the received signal S20C. The data D30C represents the propagation time Ta for the light to travel the distance L. A controller 40C performs the calculation of distance L on the basis of the light propagation time Ta and the known light propagation speed (i.e., $3 \times 10^8$ meters per second). The calculated distance L is outputted as the measurement data DL to another equipment (such as a display or a computer). The reception process circuit 30C is provided with a clock for counting time via the controller 40C from the clock generator 50C.

It is important for the measurement of the light propagation time Ta that which point between the rising edge and the falling edge of the transmission and reception pulses should be used as the measurement point. In the distance measuring equipment 1C, the light propagation time Ta is the time period from the peak point tp0 when the quantity of the pulsed light P entering directly from the transmitter 10C is the maximum in the receiver 20C to the peak point tp1 when the quantity of the pulsed light P entering after reflected by the object Q is the maximum. Namely, the transmission time point of the pulsed light P is regarded as the peak point tp0, and the reception time point is regarded as the peak point tp1. This setting of the time measurement point enables a high accuracy of the measurement regardless of the reflectivity of the object U.

It is because that the inflection point of the pulse waveform, i.e., the peak position on the time axis does not vary though the quantity of the received light may vary in accordance with the reflectivity of the object Q. In addition, though the transmission time point can be set on the basis of the output timing of the light emission control signal, it is better to monitor the actual quantity of the transmitted light to detect the peak point tp0 as in this example, so that influences of character variation of the light emitter, delay of the control signal and other factors.

Figure 12:
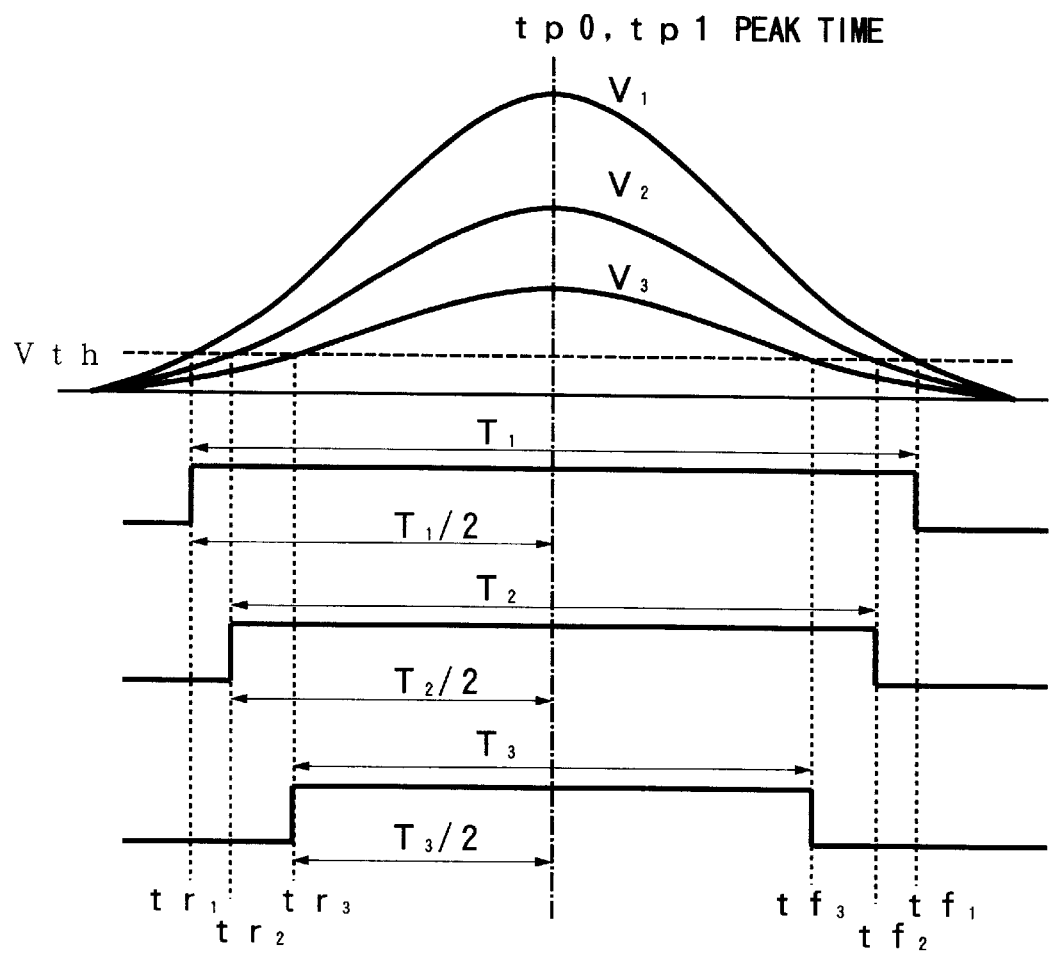
FIG. 12 is a diagram showing schematically how to determine the peak point.

FIG. 12 shows schematically how to determine the peak point.

If the pulse waveform has a symmetric crest as shown in FIG. 12, the peak point tp0 (or tp1) is in the middle between the rising and the falling edges of the pulse regardless of the amplitude of the pulse (the peak value). Therefore, the effective light quantity periods T1, T2 and T3 are determined as the period from the points tr1, tr2 and tr3 when the pulse light quantity V1, V2 and V3 exceed the threshold Vth to the points tf1, tf2 and tf3 when the pulse light quantity V1, V2 and V3 fall below the threshold Vth, and a half of the effective light quantity periods are calculated. The time point when the half of the effective light quantity periods pass from the points tr1, tr2 and tr3 is regarded as the peak point tp0 (or tp1).

Figure 13:
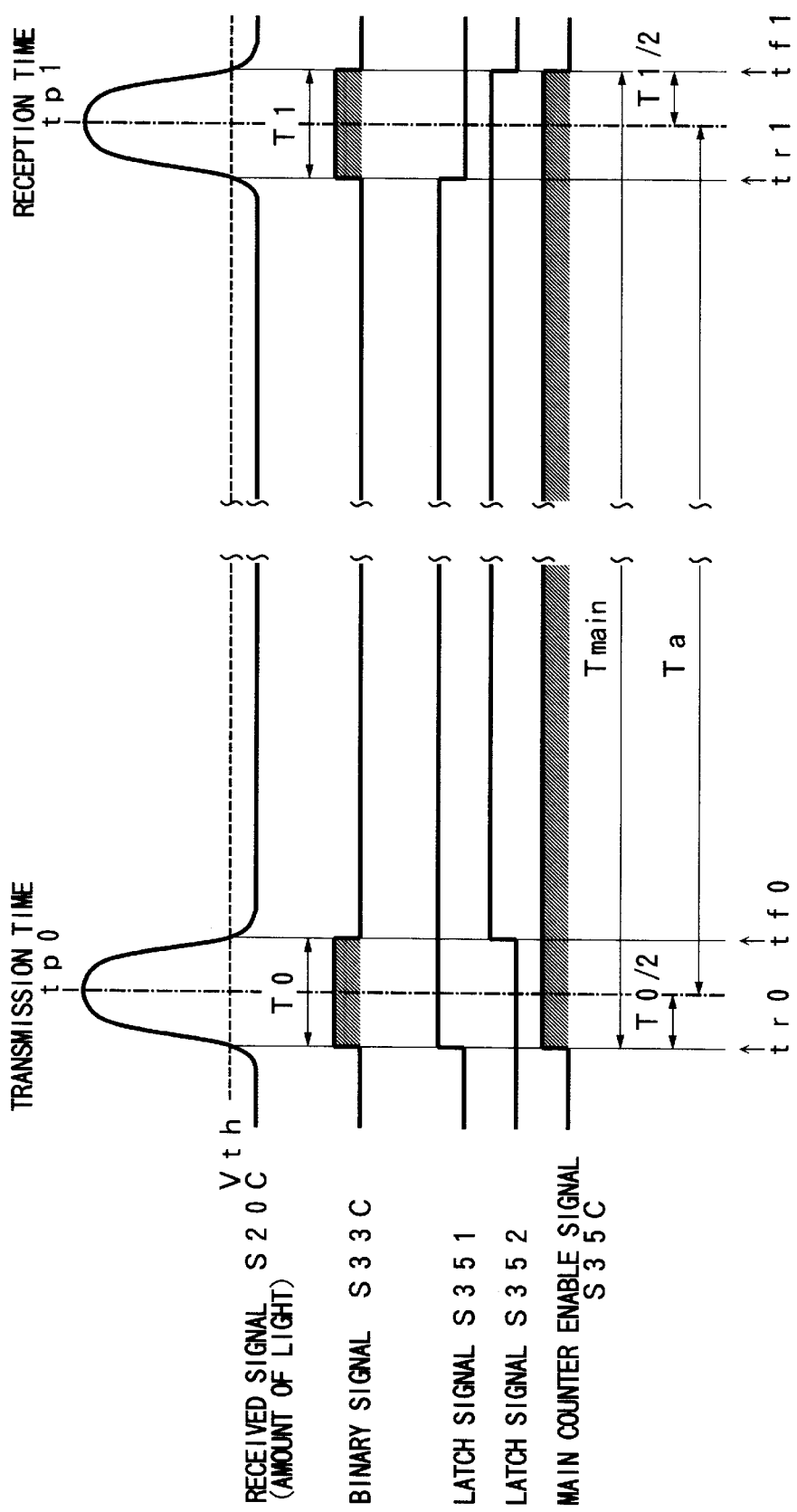
FIG. 13 is a timing chart of the reception process.
Figure 14:
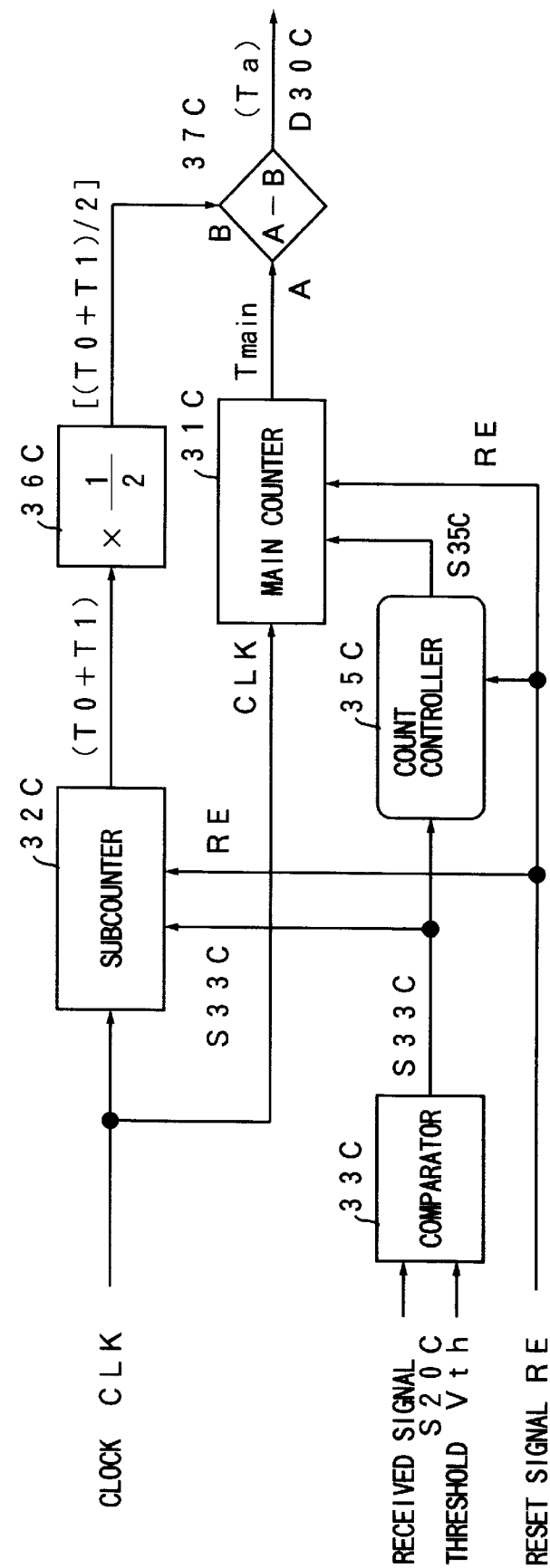
FIG. 14 is a block diagram of the reception process circuit.
Figure 15:
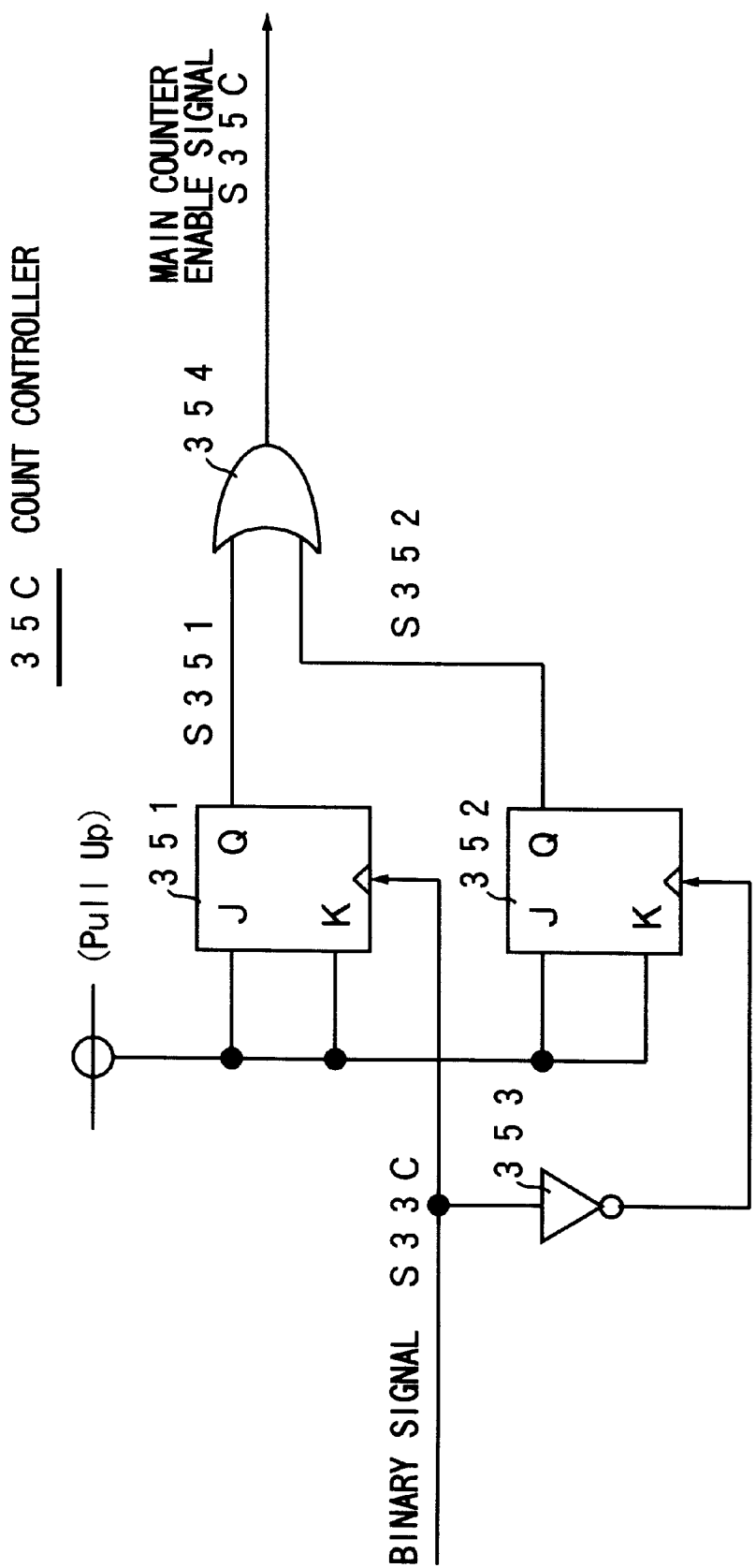
FIG. 15 is a circuit diagram of the count controller shown in FIG. 14.

FIG. 13 is a timing chart of the reception process, FIG. 4 is a block diagram of the reception process circuit 30C, and FIG. 15 is a circuit diagram of the count controller 35C shown in FIG. 14.

As mentioned above, since the pulsed light P enters the photosensor 21C from the transmitter 10C and the outside sequentially, two peaks appear in the received signal S20C during measurement. The light propagation time Ta can be calculated by measuring the effective light quantity periods T0 and T1 of the transmission and the reception, and by measuring the time period Tmain from the front edge of the effective light quantity period T0 to the rear edge of the effective light quantity period T1, as shown in the following equation (5).

$$Ta = Tmain - T0/2 - T1/2 \qquad (5)$$
$$= Tmain - (T0 + T1)/2$$

As shown in FIG. 14, the reception process circuit 30C includes two time counters (a main counter 31C and a subcounter 32C) that count the clock CLK, a comparator 33C that converts the received signal S20C into a binary signal by the threshold Vth, a count controller 35C that generates a main counter enable signal S35C, a divider 36C that calculates a half value of the output of the subcounter 32C and a subtracter 37C that subtracts the output of the divider 36C from the output of the main counter 31C. The period of the clock CLK is much shorter than the pulse width of the pulsed light P; it is approximately 10 nanoseconds, for example. The binary signal S33C generated by the comparator 33C becomes active in the effective light quantity periods T0 and T1 of the transmission and the reception. The binary signal S33C is inputted to the count controller 35C and is used as the subcounter enable signal. The subcounter 32C counts the effective light quantity periods T0 and T1. The main counter 31C counts the above-mentioned period Tmain. The main counter 31C and the subcounter 32C are provided with the reset signal RE from the controller 40C at a proper timing, so the counter values are zero when starting the measurement.

As shown in FIG. 15, the count controller 35C includes two JK flip-flop 351 and 352, an inverter 353 and an OR gate 354. The JK flip-flop 351 turns the status at the turn-on edge where the binary signal S33C switches from the non-active level to the active level so as to output a latch signal S351 that is active from the front edge of the effective light quantity periods T0 to the front edge of the effective light quantity periods T1. The other JK flip-flop 352 turns the status at the turn-off edge where the binary signal S33C switches from the active level to the non-active level so as to output a latch signal S352 that is active from the rear edge of the effective light quantity periods T0 to the rear edge of the effective light quantity periods T1. The OR signal of these latch signals S351 and S352 is the main counter enable signal S35C.

Fourth Embodiment

Figure 16:
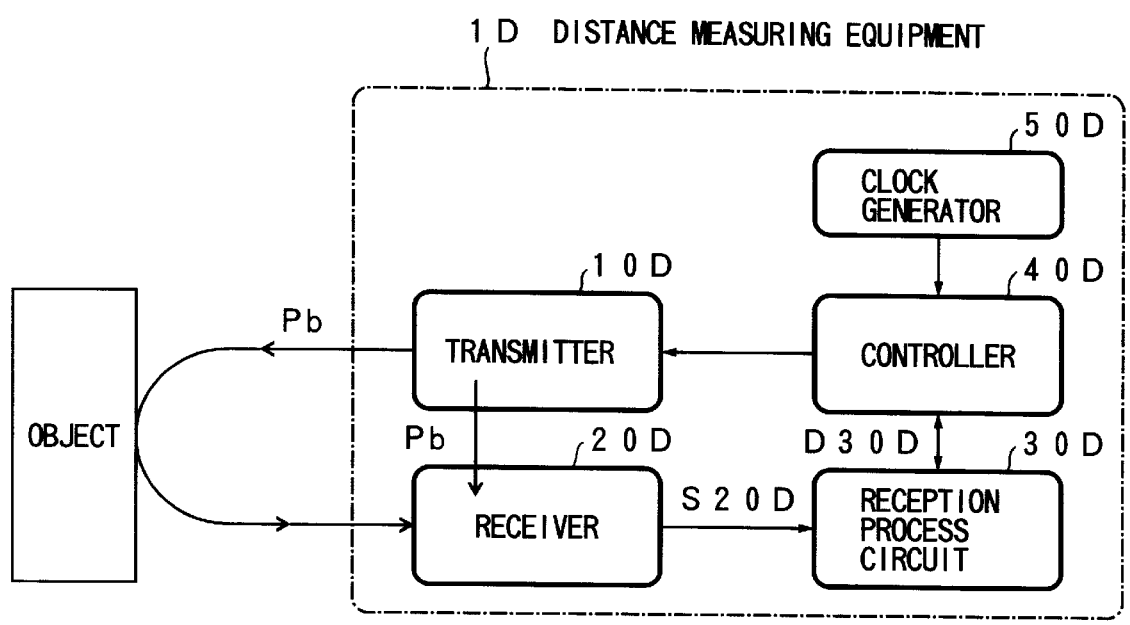
FIG. 16 is a diagram schematically showing a distance measuring equipment according to a third embodiment of the present invention.

FIG. 16 is a diagram schematically showing a distance measuring equipment according to a third embodiment of the present invention. In FIG. 16, each element of the distance measuring equipment ID has the same reference numeral as the element having the same function of the distance measuring equipment IC shown in FIG. 11 and suffix "D".

The distance measuring equipment ID includes a transmitter 10D, a receiver 20D, a reception process circuit 30D, a controller 40D and a clock generator 50D. The feature of the distance measuring equipment ID is that the waveform of the pulsed light Pb has an asymmetric crest. The constitutions of the transmitter 10D, the receiver 20D and the clock generator 50D are the same as in the distance measuring equipment 1C explained above. It is also the same that the light propagation time Ta is measured on the basis of the peak points tp0 and tp1. In the distance measuring equipment 1D of this embodiment too, a small quantity of pulsed light Pb is transmitted from the transmitter 10D to the receiver 20D simultaneously with transmission to the outside. Hereinafter, the configuration and the operation of the distance measuring equipment 1D will be explained with concentrating the difference from the distance measuring equipment 1C.

Figure 17:
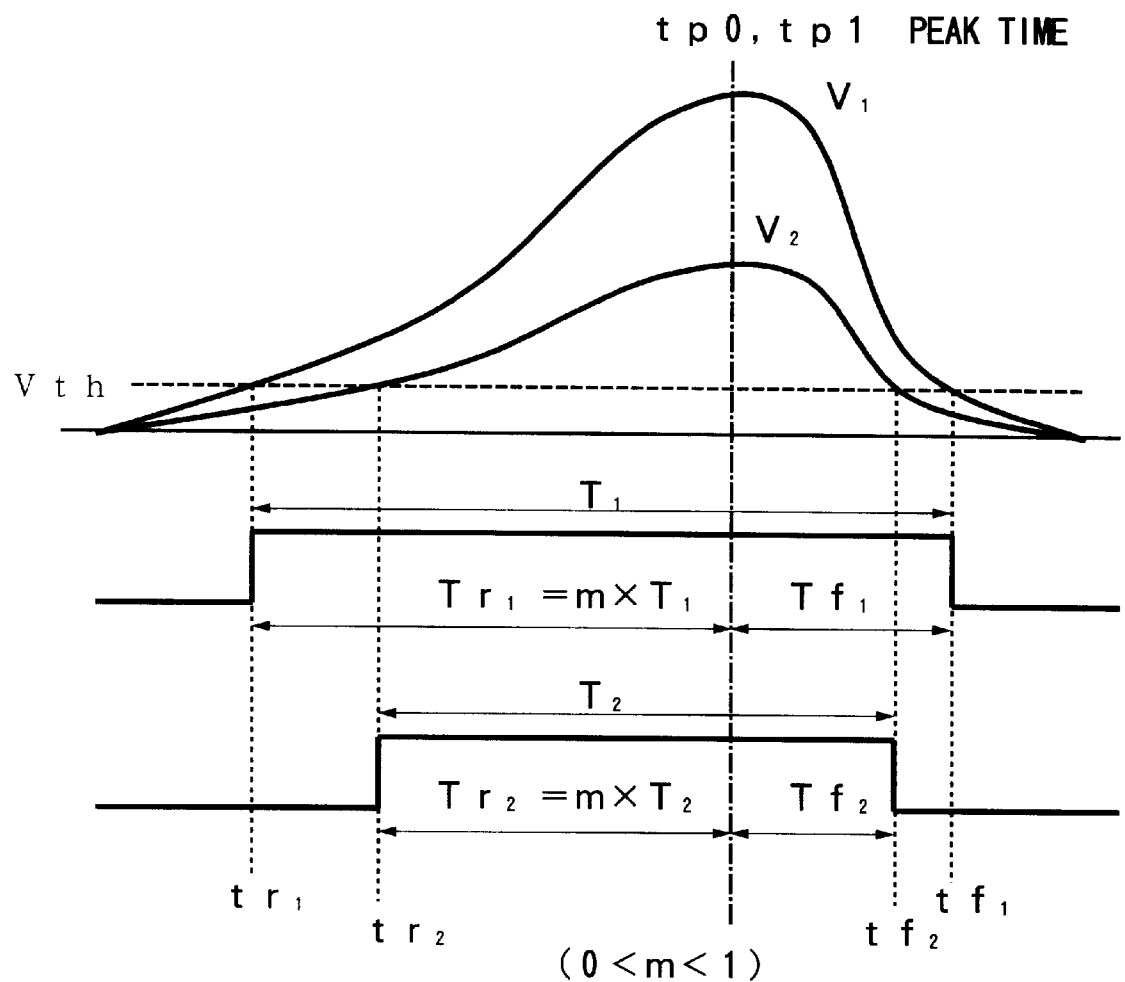
FIG. 17 is a diagram schematically showing how to determine the peak point in the fourth embodiment.

FIG. 17 shows schematically how to determine the peak point in the fourth embodiment.

Even if the pulse waveform has an asymmetric crest as shown in FIG. 17, the peak point tp0 (or tp1) is the point that divides the period from the rising edge to the falling edge of the pulse by a constant ratio of m:(1−m) regardless of the pulse width (here, 0<m<1). Therefore, the effective light quantity periods T1 and T2 are determined as the period from the points tr1 and tr2 when the pulse light quantity V1 and V2 exceed the threshold Vth to the points tf1 and tf2 when the pulse light quantity V1 and V2 fall below the threshold Vth. Then, the time periods Tr1, Tr2 that are m times the periods T1, T2 or the time periods Tf1, Tf2 that are (1−m) times the periods T1, T2 are calculated. The time point when the time periods Tr1, Tr2 pass from the points tr1, tr2 is regarded as the peak point tp0 (or tp1). The time point when it goes back time periods Tf1, Tf2 before the points tf1, tf2 is also regarded as the peak point tp0 (or tp1).

Figure 18:
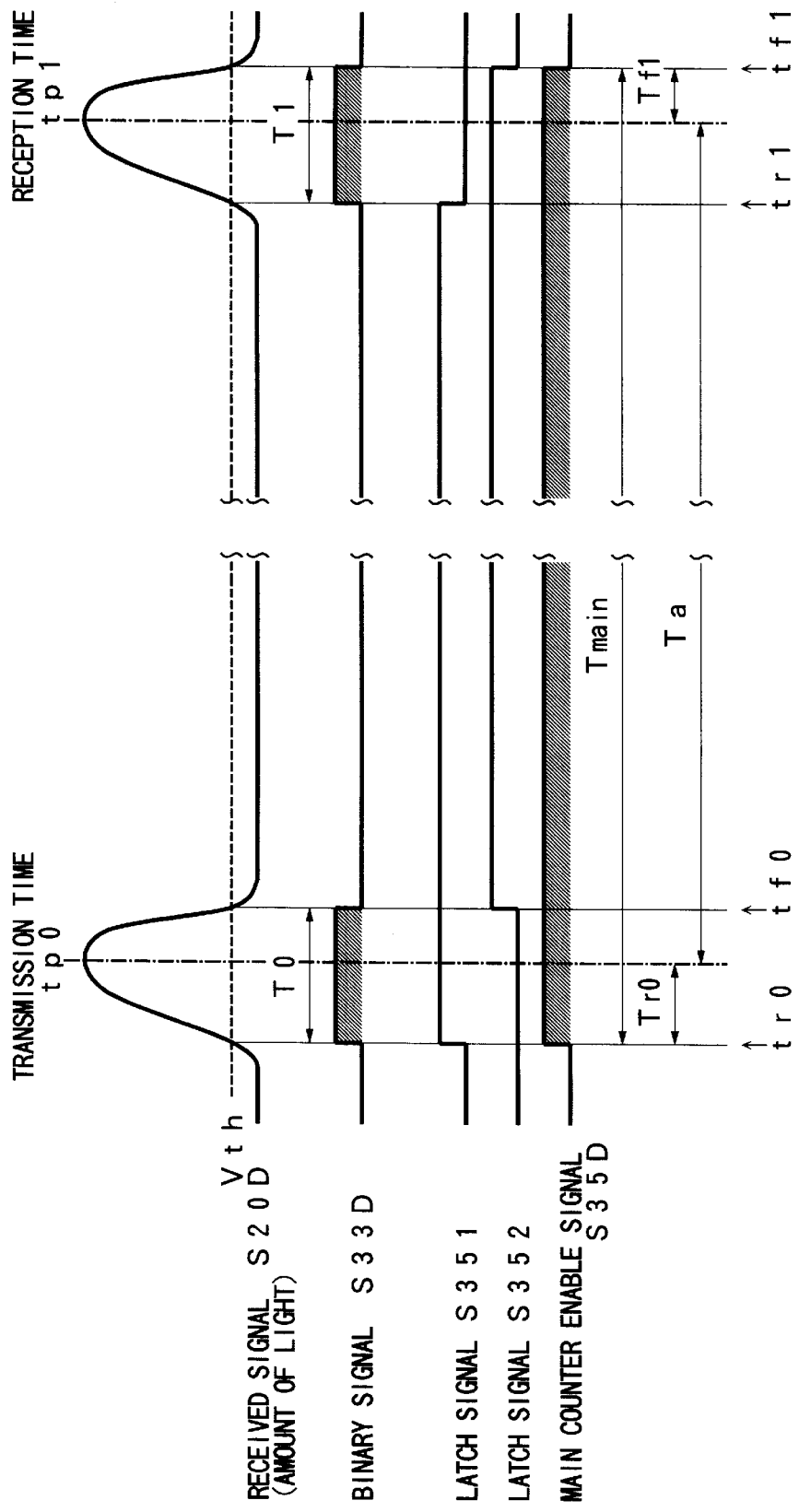
FIG. 18 is a timing chart of the reception process in the fourth embodiment.
Figure 19:
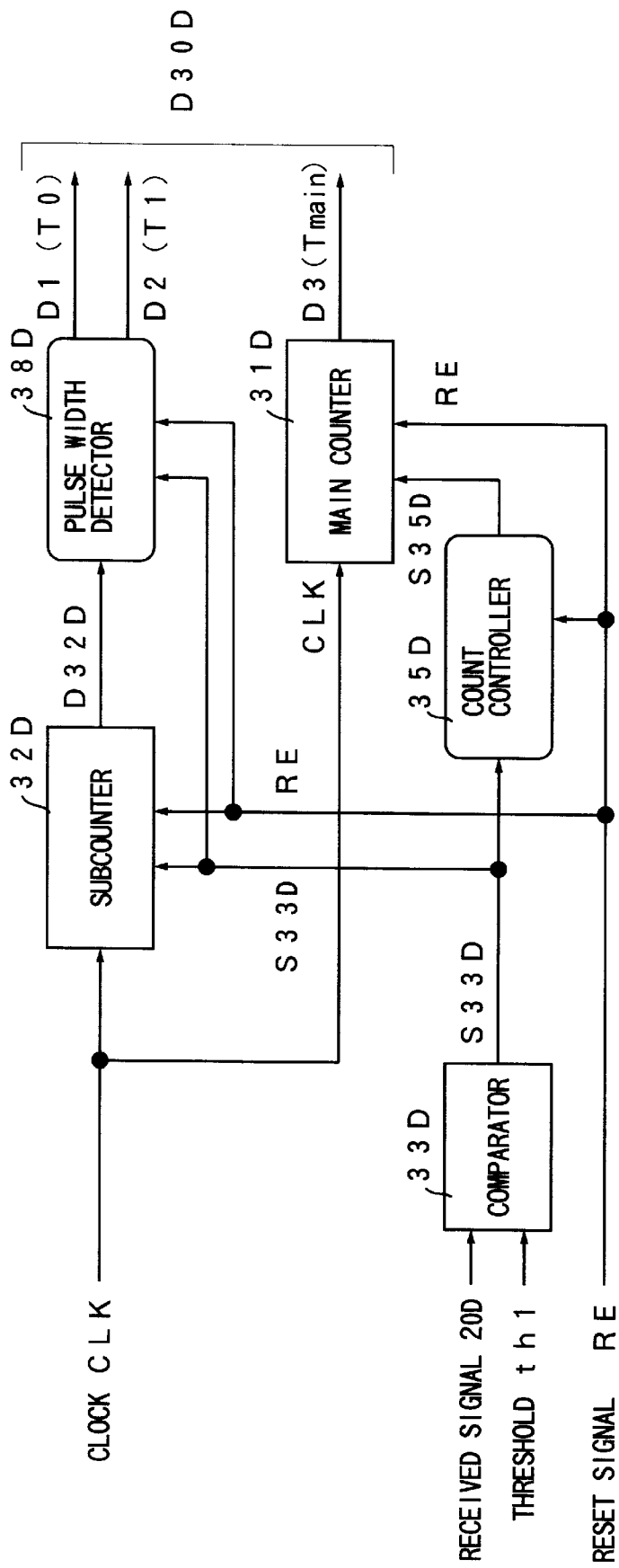
FIG. 19 is a block diagram of the reception process circuit shown in FIG. 16.
Figure 20:
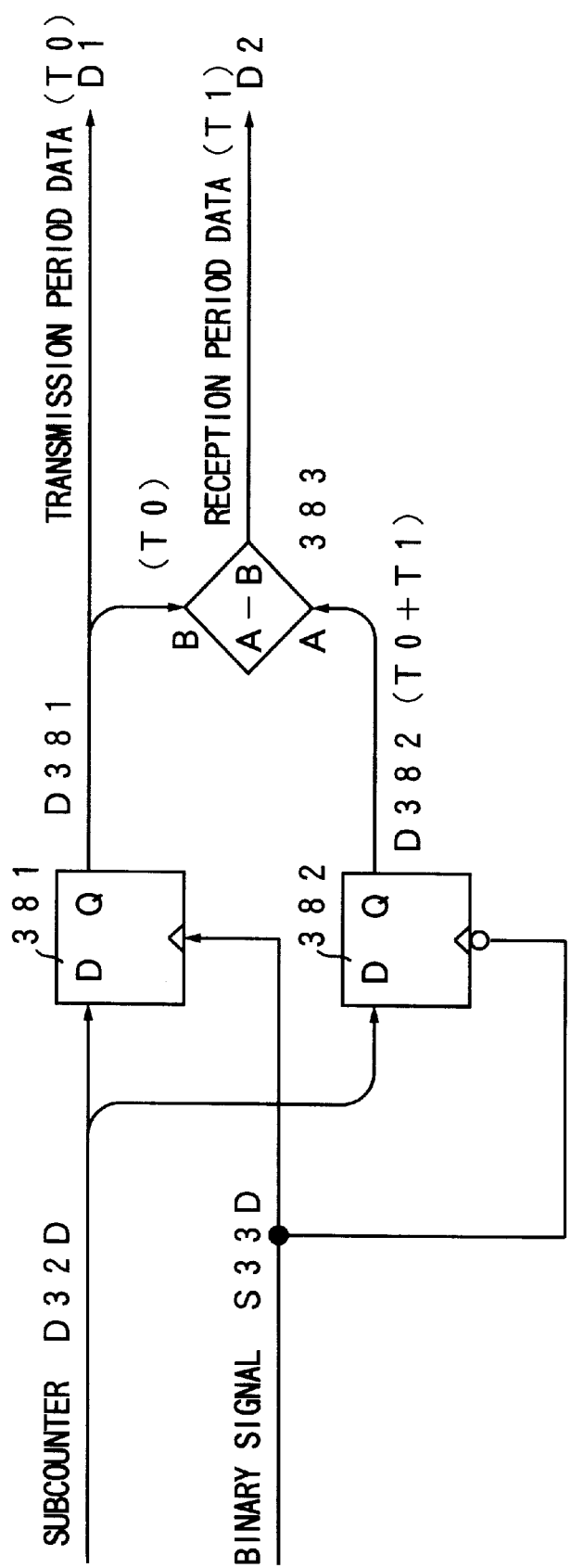
FIG. 20 is a circuit diagram of the pulse width detector.
Figure 21:
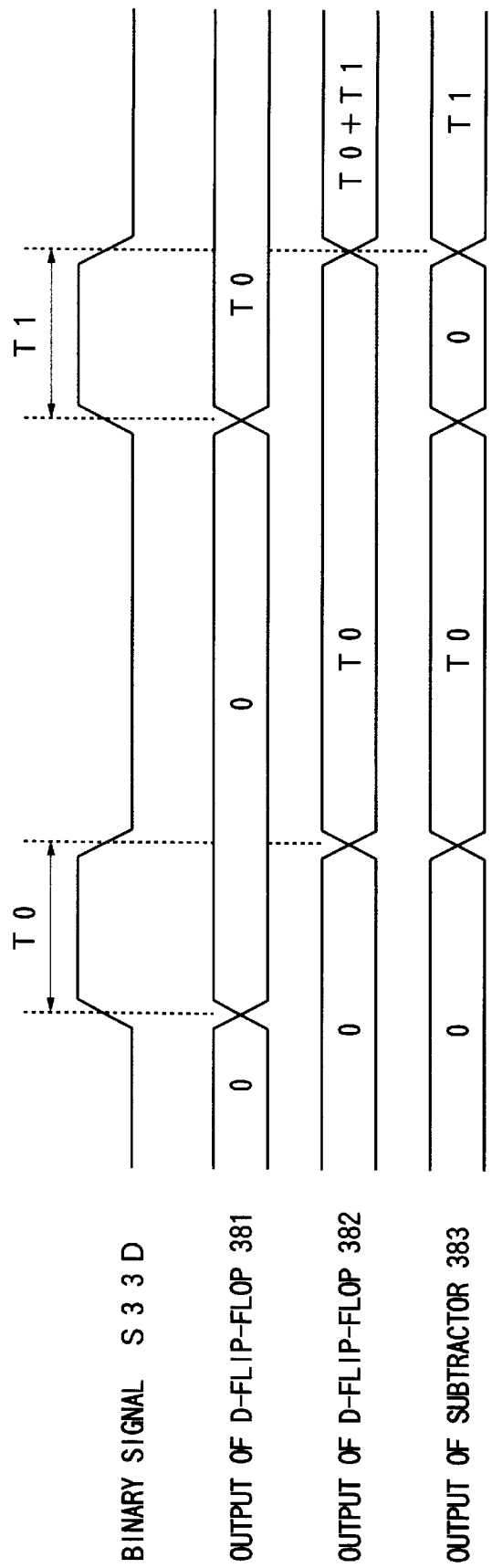
FIG. 21 is a timing chart of the pulse width detector.

FIG. 18 is a timing chart of the reception process, FIG. 19 is a block diagram of the reception process circuit 30D shown in FIG. 16. FIG. 20 is a circuit diagram of the pulse width detector 38D, and FIG. 21 is a timing chart of the pulse width detector 38D. In FIG. 19, each element of the reception process circuit 30D has the same reference numeral as the element having the same function of the reception process circuit 30D shown in FIG. 14 and suffix "D".

As mentioned above, since the pulsed light Pb enters the photosensor 20D from the transmitter 10D and the outside sequentially, two peaks appear in the received signal S20D during measurement. The light propagation time Ta can be calculated by measuring the effective light quantity periods T0 and T1 of the transmission and the reception, and by measuring the time period Tmain from the front edge of the effective light quantity period T0 to the rear edge of the effective light quantity period T1, as shown in the following equation (6).

$$Ta = Tmain - m \times T0 - (1-m) \times T1 \qquad (6)$$

where 0<m<1

The coefficient m in the equation (6) is previously determined by observing the pulse waveform by an oscilloscope, for example, and is stored in the memory of the controller 40D.

As shown in FIG. 19, The reception process circuit 30D includes two time counters (a main counter 31D and a subcounter 32D) that count the clock CLK, a comparator 33D that converts the received signal S20D into a binary signal by the threshold Vth, a count controller 35D that generates a main counter enable signal S35D and a pulse width detector 38D that determines the effective light quantity periods T0 and T1 on the basis of the output D32D of the subcounter 32D. The period of the clock CLK is much shorter than the pulse width of the pulsed light P. The configuration of each portion except the pulse width detector 38D is similar to that of the reception process circuit 30D explained above with reference to FIG. 14. The binary signal S33D generated by the comparator 33D becomes active in the effective light quantity periods T0 and T1 of the transmission and the reception. The binary signal S33D is inputted to the count controller 35D and is used as the subcounter enable signal. The binary signal S33D is also imparted to the pulse width detector 38D. The subcounter 32D counts the effective light quantity periods T0 and T1, and the main counter 31D counts the above-mentioned period Tmain. The main counter 31D and the subcounter 32D are provided with the reset signal RE from the controller 40D at proper timing, so the counter values are zero when starting the measurement. The data D30D sent from the reception process circuit 30D to the controller 40D includes transmission period data D1 that represents the length of the effective light quantity period T0, transmission period data D2 that represents the length of the effective light quantity period T1 and D3 that represents the period Tmain.

A controller 40D performs the calculation of the light propagation time Ta based on the equation (6).

As shown in FIG. 20, the pulse width detector 38D includes two D flip-flop 381 and 382 and a subtracter 383. The D flip-flop 381 latches the output S32D of the subcounter 32D at the turn-on edge of the binary signal S33D. The other D flip-flop 382 latches the output S32D of the subcounter 32D at the turn-off edge of the binary signal S33D. The subtracter 383 subtracts the output D381 of the D flip-flop 381 from the output D382 of the D flip-flop 382.

As shown in FIG. 21, after the effective light quantity periods T1, the output D381 of the D flip-flop 381 represents the length of the effective light quantity period T0, the output D382 of the D flip-flop 382 represents the sum length of the effective light quantity periods T0 and T1, and the output of the subtracter 383 represents the length of the effective light quantity period T1.

In the above-mentioned embodiment, the variation of the transmitter explained in the first embodiment with reference to FIG. 6 can be applied. Similarly, the variation of the receiver explained in the first embodiment with reference to FIG. 7 can be applied.

Fifth Embodiment

The above-mentioned embodiment determines both of the peak points tp0 and tp1 for the transmission and the reception on the basis of the photoelectric conversion signal of the pulsed light. However, concerning the transmission it does not always required to perform the photoelectric conversion. The peak point tp0 can be determined on the basis of the light emission timing. This configuration is suitable for simplifying the equipment. If the light emission timing is stable, an adequate accuracy of the measurement can be obtained.

Figure 22:
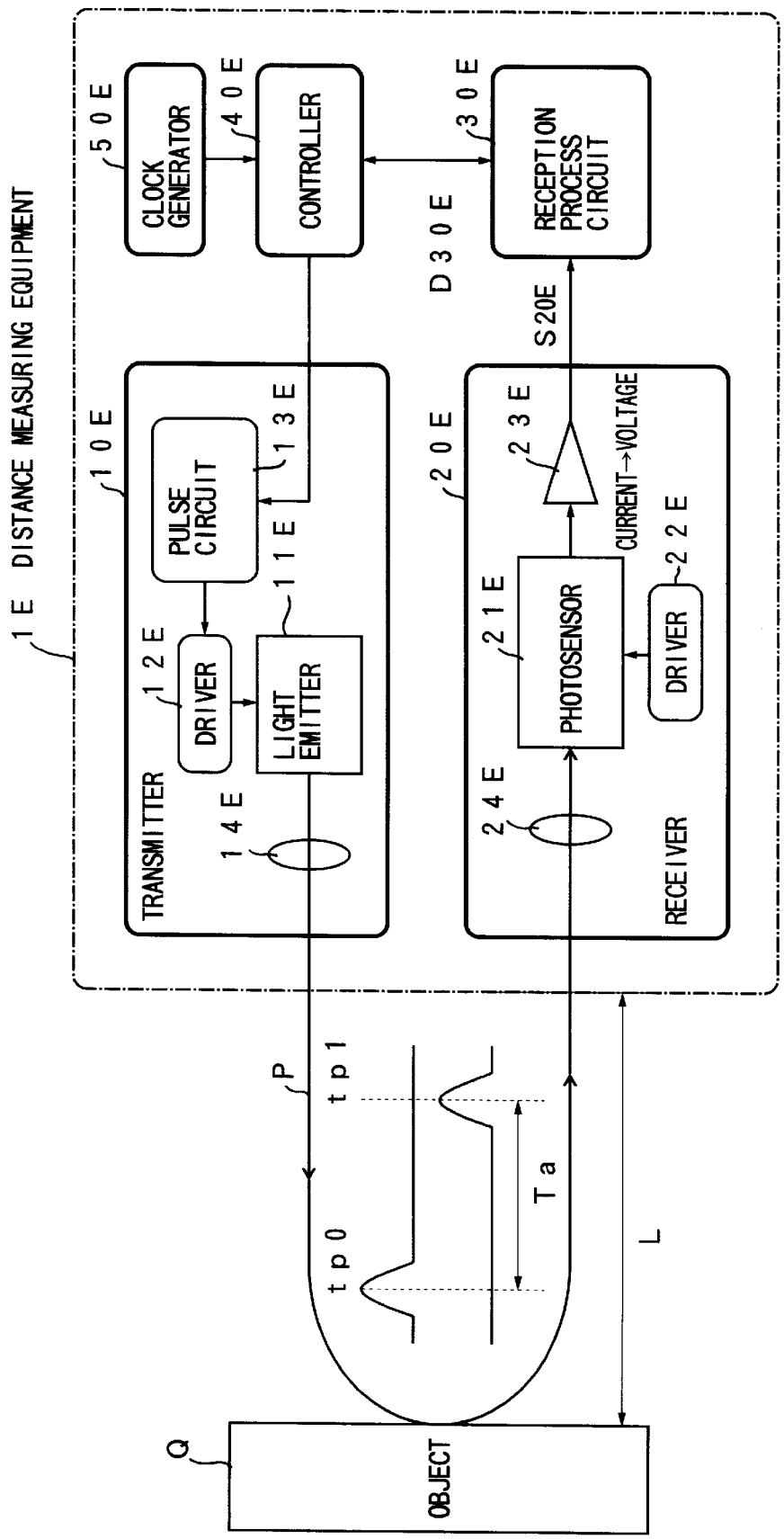
FIG. 22 is a diagram that schematically shows a distance measuring equipment according to a fifth embodiment of the present invention.

FIG. 22 is a diagram that schematically shows a distance measuring equipment according to a fifth embodiment of the present invention. In FIG. 22, each element of the distance measuring equipment 1E has the same reference numeral as the element having the same function of the distance measuring equipment 1C shown in FIG. 11 and suffix "E".

The distance measuring equipment 1E includes a transmitter 10E, a receiver 20E, a reception process circuit 30E, a controller 40E and a clock generator 50E. The transmitter 10E includes a light emitter (e.g., a semiconductor laser) 11E, a driver 12E for the light emitter, a pulse circuit 13E for restricting the emission period and a lens 14E for transmitting light. The transmitter 10E transmits pulsed light P having a pulse width of approximately 100 nanoseconds to the outside responding to the instruction of the controller 40E. The pulse waveform has a symmetric crest. The receiver 20E includes a photosensor (e.g., a photodiode) 21E, a driver 22E for the photosensor 21E, an amplifier 23E for converting a photocurrent into a voltage and a lens 24E for receiving light. The receiver 20E outputs the received signal (the photoelectrically converted signal) S20E to the reception process circuit 30E. The reception process circuit 30E generates the data D30E corresponding to the distance L to the object Q in the outside in accordance with the received signal S20E. The data D30E represents the light propagation time for the light to travel the distance L. A controller 40E performs the calculation of distance L on the basis of the light propagation time Ta and the known light propagation speed (i.e., $3 \times 10^8$ meters per second). The calculated distance L is outputted as the measurement data DL to another equipment (such as a display or a computer). The reception process circuit 30E is provided with a clock for counting time via the controller 40E from the clock generator 50E.

Figure 23:
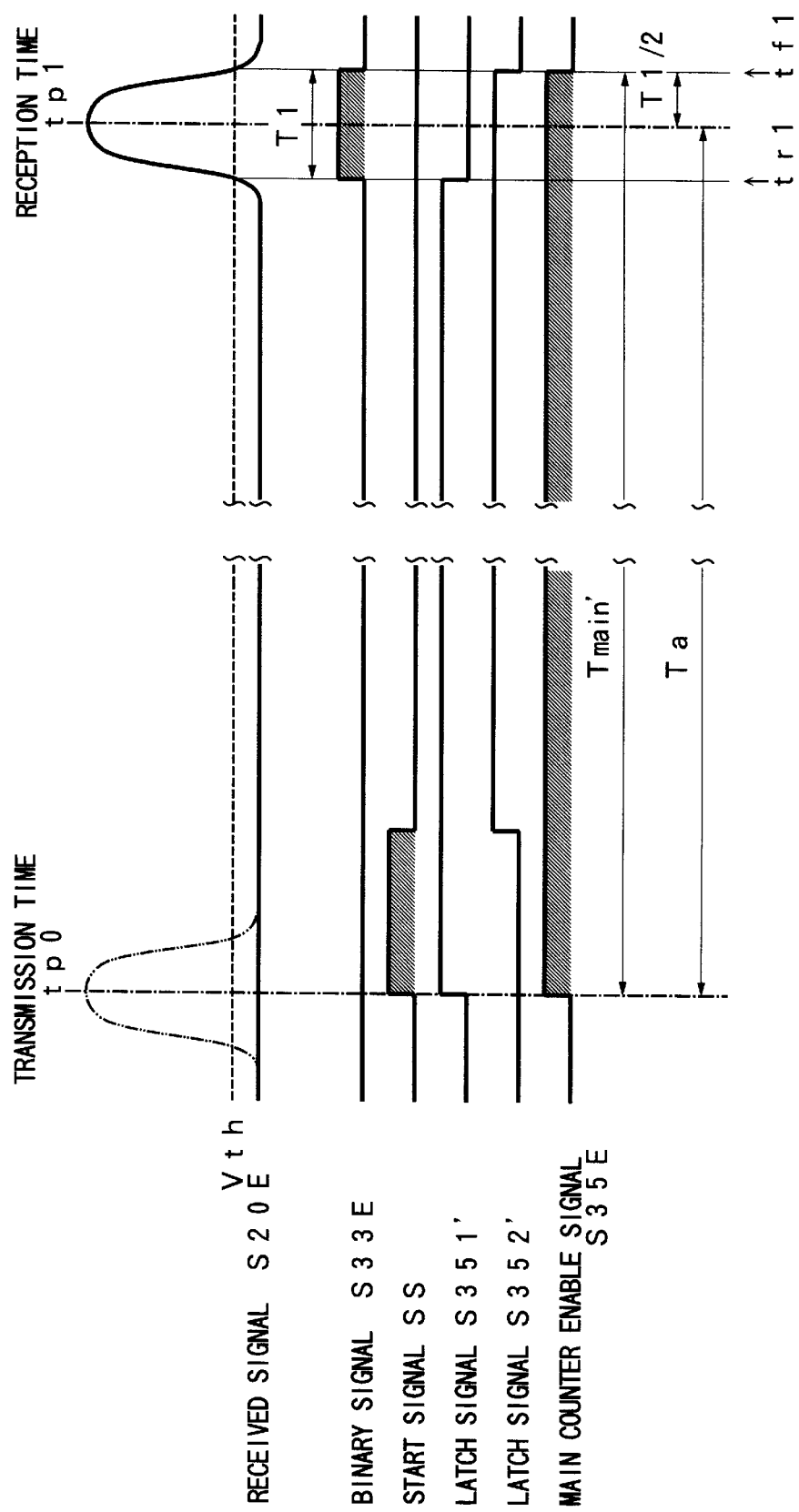
FIG. 23 is a timing chart of the reception process in the fifth embodiment.
Figure 24:
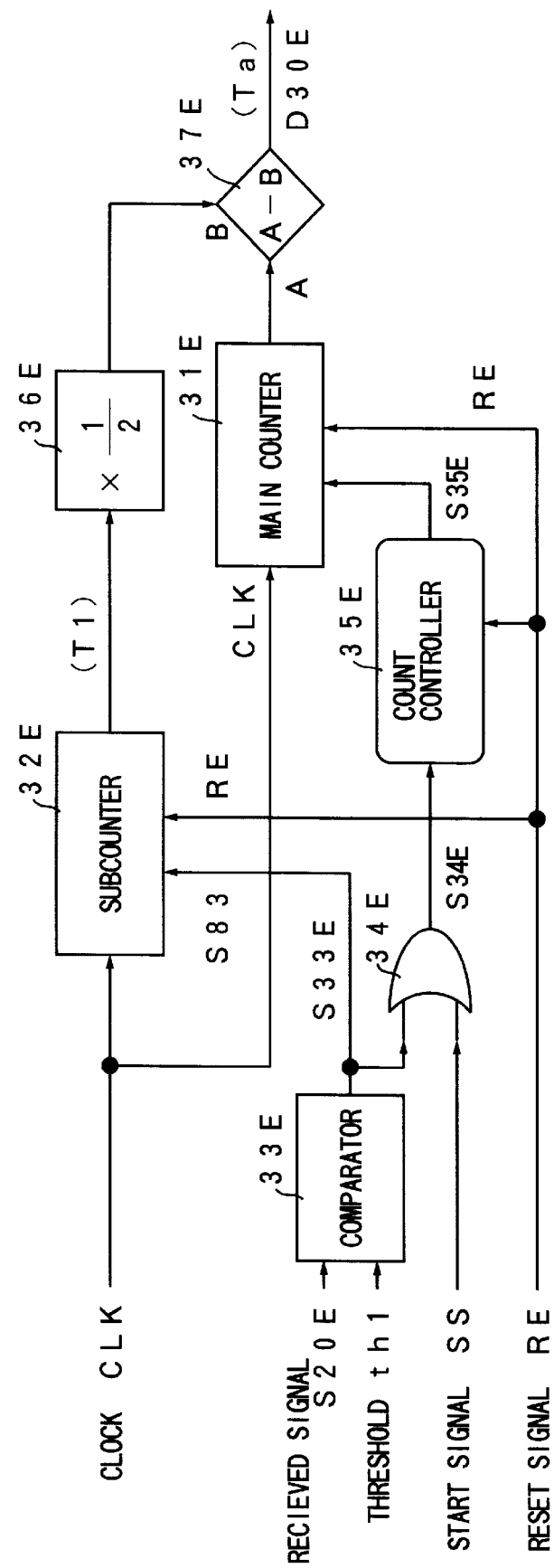
FIG. 24 is a block diagram of the reception process circuit according to the fifth embodiment.

FIG. 23 is a timing chart of the reception process in the fifth embodiment, and FIG. 24 is a block diagram of the reception process circuit 30E according to the fifth embodiment.

The light propagation time Ta can be calculated by measuring the effective light quantity periods T1 of the reception and the time period Tmain' from the peak point tp0 of the transmission to the rear edge of the effective light quantity period T1, as shown in the following equation (7).

$$Ta = Tmain' - (T0 + T1)/2 \quad (7)$$

As shown in FIG. 24, the reception process circuit 30E includes two time counters (a main counter 31E and a subcounter 32E) that count the clock CLK, a comparator 33E that converts the received signal S20E into a binary signal by the threshold Vth, an OR circuit 34E to which the binary signal S33E and a start signal SS are inputted, a count controller 35E that generates a main counter enable signal S35E, a divider 36E that calculates a half value of the output of the subcounter 32E and a subtracter 37E that subtracts the output of the divider 36E from the output of the main counter 31E.

The period of the clock CLK is much shorter than the pulse width of the pulsed light P. The binary signal S33E becomes active in the effective light quantity periods T1 of the reception and is used as the count enable signal for the subcounter 32E. Therefore, the subcounter 32E counts the effective light quantity periods T1.

The start signal SS is a control signal that is synchronized with turning on and off of the light emitter 11E, and is active in the period from the peak point tp0 of the transmission to a predetermined time point before the effective light quantity period T1 of the reception, as shown in FIG. 23. The relationship between phases of the turning on and off of the light emitter 11E and the start signal SS is selected previously in accordance with waveform observation so that the turn-on edge of the start signal SS is identical to the peak point tp0. The turn-off edge of the start signal SS is not required to be set precisely.

The count controller 35E generates a main count enable signal S35E that is active in the period Tmain' mentioned above on the basis of the output signal S34E of the OR circuit 34E. Therefore, the main counter 31E counts the period Tmain'. The configuration of the count controller 35E is the same as that shown in FIG. 15. The main counter 31E and the subcounter 32E are provided with the reset signal RE from the controller 40E at a proper timing, so the counter values are zero when starting the measurement.

As a variation of the reception process circuit 30E, the binary signal S33E can be replaced with the output signal 834E of the OR circuit 34E for the subcounter enable signal. In this configuration, the start signal SS is set to be active only in the effective light quantity period T0 of the transmission, and the light propagation time Ta is calculated in accordance with the equation (5).

According to the distance measuring equipment 1C and 1D of the above-mentioned embodiments, since the pulsed light is monitored for determining the transmission time point tp0, measurement with a high accuracy can be realized without influences of signal delay in the circuit and other factors. In addition, the distance measuring equipment 1C, 1D and 1E can be used as a three-dimensional input apparatus by changing the transmission orientation of the pulsed light so as to scan the object Q and by measuring the a distance to the object for each transmission orientation.

What is claimed is:

1. A device for measuring a distance based on a flight time defined by an emission time point and a reception time point of light, the device comprising:
   a light emitter for emitting a pulsed light to the outside of the device, the pulsed light having a wave form in which intensity thereof varies with time;
   a receiver for receiving the pulsed light reflected by an object outside of the device and generating a plurality of reception signals respectively indicating an instantaneous intensity of the received light at a plurality of timings by performing a photoelectric conversion of the received light; and a processor for calculating a time barycenter as the reception time point on the basis of the plurality of reception signals.

2. The device for measuring distance according to claim 1, wherein each of the plurality of reception signals is an integral analog signal of the photoelectric conversion of the received light.

3. A device for measuring a distance based on a flight time defined by an emission time point and a reception time point of light, the device comprising:

a light emitter for emitting a pulsed light to the outside of the device, the pulsed light having a wave form in which intensity thereof varies with time;

a receiver for receiving the pulsed light reflected by an object outside of the device, the transmitter transmitting the pulsed light to the object and the receiver simultaneously, and the receiver generating a plurality of reception signals respectively indicating an instantaneous intensity of the received light at a plurality of timings by perfoming a photoelectric conversion of the received light; and a processor for calculating a time barycenter as the reception time point on the basis of the plurality of reception signals.

4. The device for measuring distance according to claim 3 wherein the receiver includes a first photoelectric converter for receiving the pulsed light from the light emitter and a second photoelectric converter for receiving the pulsed light reflected by the object outside of the equipment, and the emission time point is determined on the basis of the electric signal obtained by the first photoelectric converter and the reception time point is determined on tie basis of the electric signal obtained by the second photoelectric converter.

5. A device for measuring a distance based on a flight time defined by an emission time point and a reception time point of light, the device comprising:

a light emitter for emitting a pulsed light to the outside of the device, the pulsed light having a wave form in which intensity thereof varies with time;

a receiver for receiving the pulsed light reflected by an object outside of the device, the transmitter transmitting the pulsed light to the object and the receiver simultaneously plural times changing the orientation of an optical axis of the transmitter, and the receiver generating a plurality of reception signals respectively indicating an instantaneous intensity of the received light at a plurality of timings by performing a photoelectric conversion of the received light; and a processor for calculating a time barycenter as the reception time point on the basis of the plurality of reception signals.

6. A method of measuring a distance based on a flight time defined by an emission time point and a reception time point of light, comprising the steps of:

emitting a pulsed light, the pulsed light having a wave form in which intensity thereof varies with time;

receiving the pulsed light reflected by all object and generating a plurality of reception signals respectively indicating an instantaneous intensity of the received light at a plurality of timings by performing a photoelectric conversion of the received light; and calculating a time barycenter as the reception time point on the basis of the plurality of reception signals.

7. The method of measuring a distance according to claim 6 wherein data of the distance to the object is generated on the basis of the flight time from the emission time point of the pulsed light to the reception time point of the pulsed light.

8. A device for measuring a distance based on a flight time defined by an emission time point and a reception time point of light, the device comprising:

a light emitter for emitting the pulsed light to the outside of the device;

a receiver for receiving the pulsed light reflected by an object in the outside of the device and generating a reception signal indicating an instantaneous intensity of the received light; and a processor for calculating the reception time point by estimating thereof on the basis of the respective instantaneous intensity of a plurality of signals generated by the receiver.

* * * * *